(12) United States Patent
He

(10) Patent No.: US 12,502,729 B1
(45) Date of Patent: Dec. 23, 2025

(54) LASER PROCESSING EQUIPMENT

(71) Applicant: Shenzhen ParaLaser Technology Co., Ltd., Shenzhen (CN)

(72) Inventor: Long He, Shenzhen (CN)

(73) Assignee: Shenzhen ParaLaser Technology Co., Ltd., Shenzhen (CN)

( * ) Notice: Subject to any disclaimer, the term of this patent is extended or adjusted under 35 U.S.C. 154(b) by 0 days.

(21) Appl. No.: 19/226,800

(22) Filed: Jun. 3, 2025

(30) Foreign Application Priority Data

Oct. 10, 2024 (CN) .......................... 202411405273.4

(51) Int. Cl.
*B23K 26/046* (2014.01)
*B23K 26/03* (2006.01)
*B23K 26/06* (2014.01)
*B23K 26/08* (2014.01)

(52) U.S. Cl.
CPC .......... *B23K 26/032* (2013.01); *B23K 26/046* (2013.01); *B23K 26/0648* (2013.01); *B23K 26/0869* (2013.01)

(58) Field of Classification Search
CPC ........................... B23K 26/032; B23K 26/046; B23K 26/0648; B23K 26/0869; B23K 26/36
USPC ..................................................... 219/121.83
See application file for complete search history.

(56) References Cited

U.S. PATENT DOCUMENTS

| | | | | |
|---|---|---|---|---|
| 2022/0206464 | A1* | 6/2022 | Gosselin | G05B 19/40932 |
| 2023/0077978 | A1* | 3/2023 | Wögerbauer | B23K 26/142 |
| | | | | 219/121.84 |
| 2024/0176321 | A1* | 5/2024 | Shapiro | G05B 19/182 |
| 2025/0025962 | A1* | 1/2025 | Gosselin | B23K 26/36 |

FOREIGN PATENT DOCUMENTS

CN 117773376 A * 3/2024

* cited by examiner

*Primary Examiner* — Ibrahime A Abraham
*Assistant Examiner* — Daniel Ward Hatten
(74) *Attorney, Agent, or Firm* — Kirk A. Wilson; Joseph T. Guy; Patent Filing Specialist Inc.

(57) ABSTRACT

Laser processing equipment is provided. The laser processing equipment includes a laser module, a motion axis drive module, a thickness detection module, an upper computer and a lower computer. The laser module includes a laser light source module, a focusing lens and a zoom driving module, the laser light source module is configured to emit a laser beam, and the zoom driving module is configured to drive the focusing lens to move. The motion axis drive module is configured to drive the laser module to move. The thickness detection module is configured to collect thickness information of a base material to be processed. The upper computer generates a file to be processed based on the material information, the thickness information and a pattern mode to be processed. The lower computer is configured to control laser power, a zoom parameter and a motion axis parameter based on the file.

18 Claims, 15 Drawing Sheets

LASER PROCESSING EQUIPMENT

CROSS-REFERENCE TO RELATED APPLICATION

This patent application claims the benefit and priority of Chinese Patent Application No. 202411405273.4 filed with the China National Intellectual Property Administration on Oct. 10, 2024, the disclosure of which is incorporated by reference herein in its entirety as part of the present application.

TECHNICAL FIELD

The present disclosure relates to the technical field of laser processing, in particular to laser processing equipment.

BACKGROUND

With the development of laser technology, the application fields and market scope of laser processing equipment have become larger and larger in recent years, and the performance and operator experience of laser processing equipment have been increasingly concerned by the industry. How to provide laser processing equipment with higher degree of automation has become a technical problem to be solved.

SUMMARY

The present disclosure provides laser processing equipment with higher degree of automation.

The present disclosure provides laser processing equipment. The laser processing equipment includes:
- a laser module, where the laser module includes a laser light source module, a focusing lens and a zoom driving module, the laser light source module is configured to emit a laser beam, the focusing lens is located on a light path of the laser beam, the zoom driving module is connected to the focusing lens, the zoom driving module is configured to drive the focusing lens to move to change a focal spot position and/or a beam angle of the laser beam;
- a motion axis drive module, where the motion axis drive module is connected to the laser module, and the motion axis drive module is configured to drive the laser module to move;
- a thickness detection module, where the thickness detection module is configured to collect thickness information of a base material to be processed;
- an upper computer, where the upper computer is configured to acquire material information of the base material to be processed and receive the thickness information of the base material to be processed collected from the thickness detection module, and generate a file to be processed based on the material information, the thickness information and a pattern mode to be processed, the file to be processed includes target power of the laser light source module, a target zoom motion parameter of the zoom driving module, and a target motion axis parameter of the motion axis drive module; and
- a lower computer, where the lower computer is configured to receive the file to be processed from the upper computer, control power of the laser light source module as the target power, control a zoom motion parameter of the zoom driving module as the target zoom motion, and control a motion axis parameter of the motion axis drive module as a target motion axis parameter according to the file to be processed.

The present disclosure provides laser processing equipment. The laser processing equipment includes a laser module, a motion axis drive module, a thickness detection module, an upper computer and a lower computer. Where, the laser module includes a laser light source module, a focusing lens and a zoom driving module. The laser light source module is configured to emit a laser beam. The focusing lens is located on a light path of the laser beam. The zoom driving module is connected to the focusing lens. The zoom driving module is configured to drive the focusing lens to move to change a focal spot position and/or a beam angle of the laser beam. The motion axis drive module is connected to the laser module, and the motion axis drive module is configured to drive the laser module to move. The thickness detection module is configured to collect thickness information of a base material to be processed. The upper computer is configured to acquire material information of the base material to be processed and receive thickness information of the base material to be processed collected from the thickness detection module, and generate a file to be processed based on the material information, the thickness information and a pattern mode to be processed. The file to be processed includes target power of the laser light source module, a target zoom motion parameter of the zoom driving module, and a target motion axis parameter of the motion axis drive module. The lower computer is configured to receive the file to be processed from the upper computer, and control power of the laser light source module as the target power, control a zoom motion parameter of the zoom driving module as the target zoom motion parameter and control a motion axis parameter of the motion axis drive module as the target motion axis parameter based on the file to be processed. Obviously, the laser processing equipment according to some embodiments of the present disclosure may automatically identify a material and a thickness of the base material to be processed, and determine suitable laser processing parameters based on the material and the thickness of the base material to be processed and a pattern mode to be processed. The material of the base material to be processed does not need to be input or selected manually, so that the degree of automation is higher.

BRIEF DESCRIPTION OF THE DRAWINGS

To describe technical solutions in embodiments of the present disclosure more clearly, the following briefly describes the drawings required in the embodiments.

Reference signs in the attached figures:

1000 laser processing equipment; 900 housing; 100 laser module; 200 motion axis drive module; 300 thickness detection module; 400 upper computer; 500 lower computer; 10 laser light source module; 20 focusing lens; 30 zoom driving module; 40 lens holder; 600 image collection module; 700 material identification module; 310 position probe; 210 lifting drive module; 260 base material to be processed; 610 camera module; 220 smoke exhaust assembly; 230 smoke detection module; 221 first smoke exhaust module; 222 second smoke exhaust module; 231 first smoke detector; 240 engraved honeycomb panel; 232 second smoke detector; 31 drive motor; 32 transmission rod; 33 connecting nut; 34 guide rod; 35 position sensor; and 60 concave lens.

DETAILED DESCRIPTION OF THE EMBODIMENTS

The following clearly and completely describes the technical solutions in the embodiments of the present disclosure with reference to the drawings in the embodiments of the present disclosure. Apparently, the described embodiments are only a part rather than all of the embodiments of the present disclosure. Moreover, "examples" or "embodiments" mentioned throughout the present disclosure means that specified features, structures, or characteristics described in combination with the examples or the embodiments may be included in at least one embodiment of the present disclosure. The appearance of this phrase in various positions in the specification does not necessarily refer to the same embodiment, nor is an independent or alternative embodiment that is mutually exclusive from other embodiments. It is explicitly and implicitly understood by those skilled in the art that the embodiments described herein may be combined with other embodiments.

The present disclosure provides laser processing equipment 1000. Applications of the laser processing equipment 1000 include but are not limited to engraving, cutting, welding, drilling, marking, 3D printing and the like. In this embodiment, taking an engraving mode or a cutting mode as an example, the laser processing equipment 1000 illustrates a structure, a connection relation, a positional relation, an electrical signal interaction relation of each module in the laser processing equipment provided in the present disclosure.

Figure 1:
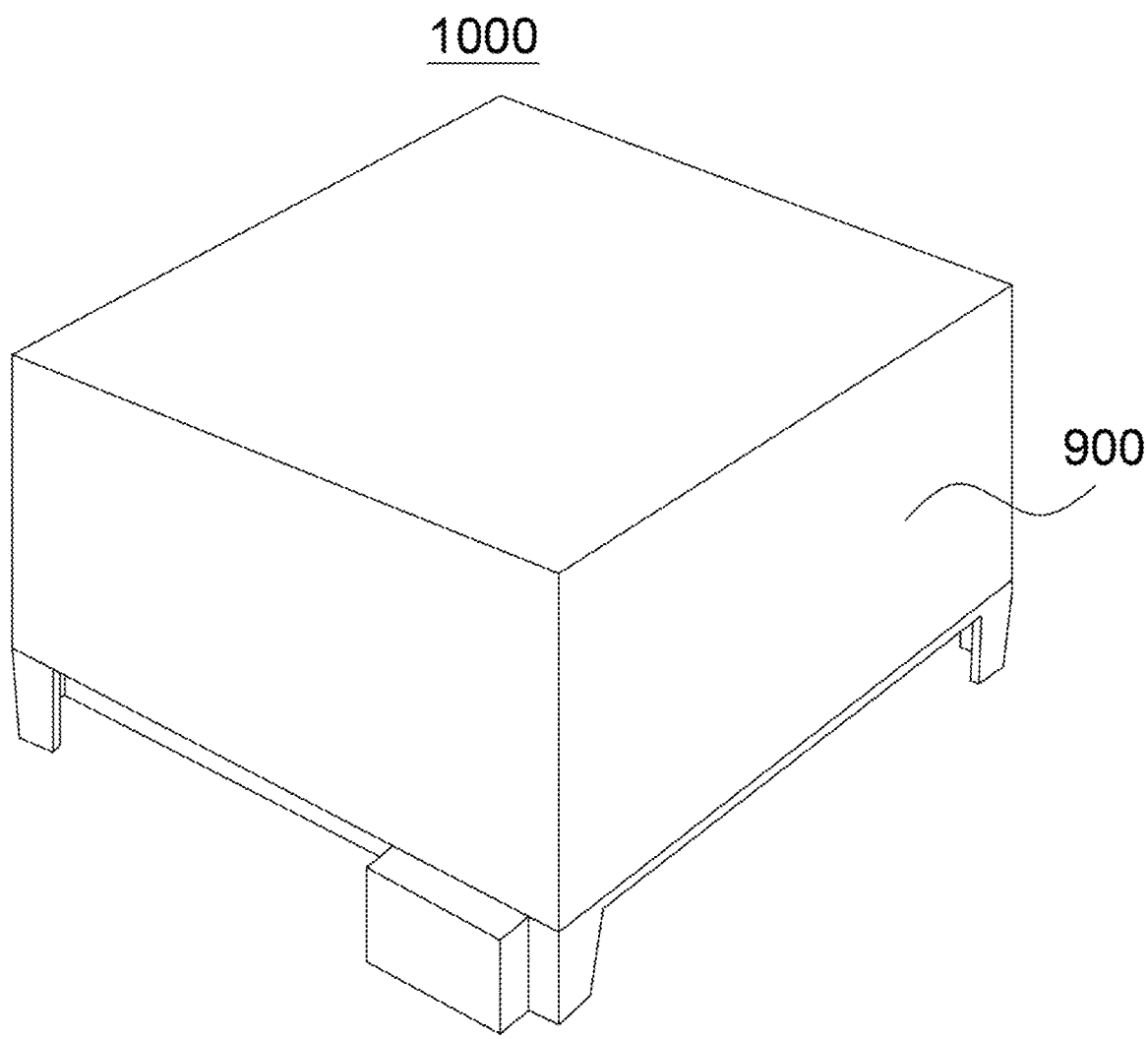
FIG. 1 is an appearance structure diagram of laser processing equipment according to an embodiment of the present disclosure.
Figure 2:
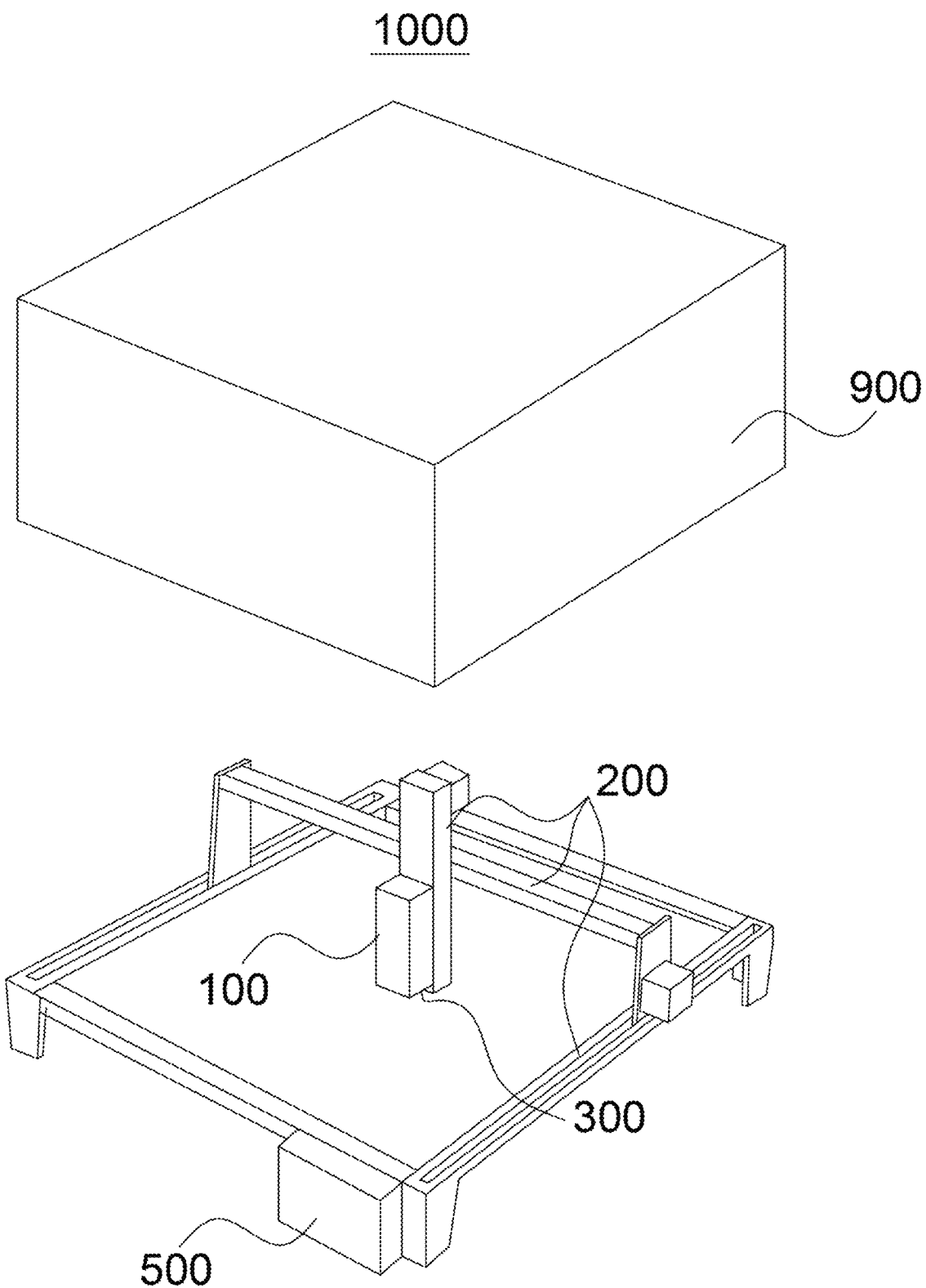
FIG. 2 is a partially split structure diagram of laser processing equipment according to an embodiment of the present disclosure.

Referring to FIG. 1 to FIG. 2, the laser processing equipment 1000 includes a housing 900, a laser module 100, a motion axis drive module 200, a thickness detection module 300, an upper computer 400 and a lower computer 500.

In some embodiments, the laser processing equipment 1000 may not be provided with a housing 900.

Figure 3:
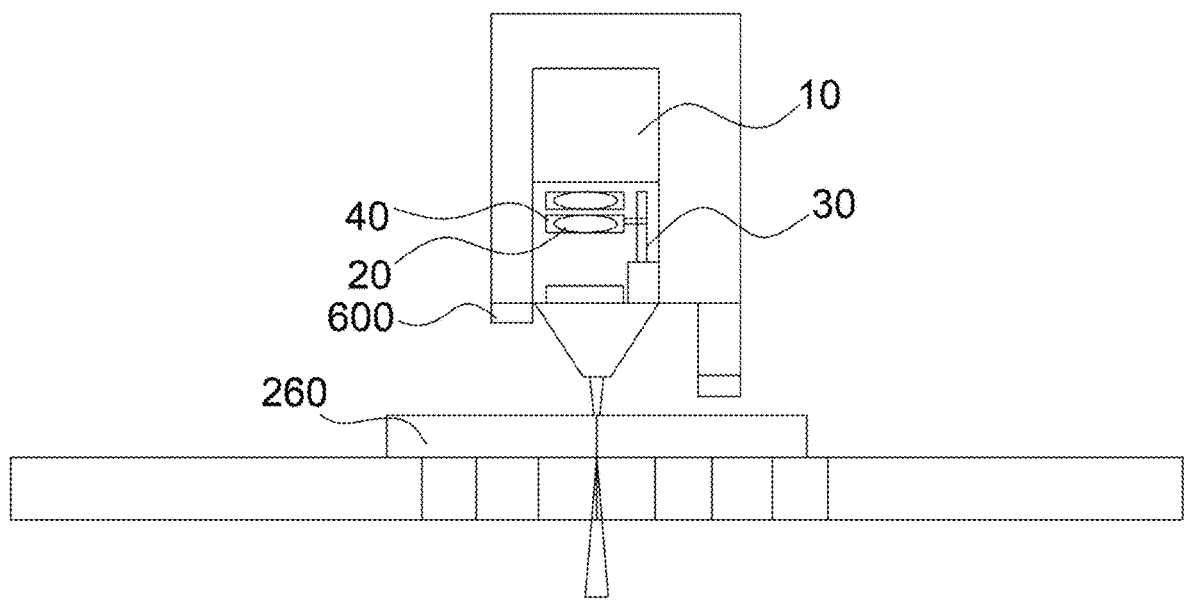
FIG. 3 is a structure diagram of a first laser module according to an embodiment of the present disclosure.

Referring to FIG. 3, the laser module 100 includes a laser light source module 10, a focusing lens 20 and a zoom driving module 30.

Optionally, the laser light source module 10, the focusing lens 20 and the zoom driving module 30 may be packaged in one same housing to form a laser head.

The laser light source module 10 is located on one side away from a light outlet of the laser head (along a light path).

The laser light source module 10 is configured to emit a laser beam. The present disclosure does not specifically limit power of the laser beam emitted by the laser light source module 10. Optionally, power emitted by the laser light source module 10 is 0 to 200 w. Further, the power emitted by the laser light source module 10 is any one of 0 to 190 w, 0 to 180 w, 0 to 170 w, 0 to 160 w, 0 to 150 w, 0 to 140 w, 0 to 130 w, 0 to 120 w, 0 to 110 w, 0 to 100 w, 0 to 90 w, 0 to 80 w, 0 to 70 w, 0 to 60 w, 0 to 50 w, 0 to 40 w, 0 to 30 w, 0 to 20 w, 0 to 10 w, and 0 to 5 w. Certainly, rated power emitted by the laser light source module 10 may be any numerical value between 200 w and 0 w, for example, in an adjustable power range of 0 to 33 w.

Then optionally, the power emitted by the laser light source module 10 is continuously adjustable in a rated power range. Hereinafter, a structure of the laser light source module 10 is described as an example.

A large quantity of lenses in the laser module 100 is provided, and the present disclosure illustrates lenses that are essential to an inventive concept. However, it does not mean that the laser processing equipment 1000 in the present disclosure has only a lens described as an example, and some lenses with other functions, such as lenses and mirrors, which are required in an actual design process, can be adapted to be added in the laser processing equipment 1000 in the present disclosure.

In the present disclosure, the focusing lens 20 is located on a light path of the laser beam. The focusing lens 20 is configured to converge a laser beam on the light path. Optionally, the focusing lens 20 is located between the laser light source module 10 and the light outlet of the laser head.

Optionally, a surface of the focusing lens 20 facing an image side in an optical axis direction is a convex surface. Optionally, a surface of the focusing lens 20 facing an image side in an optical axis direction may be a flat surface, a convex surface or a concave surface. When an object side surface of the focusing lens 20 is a concave surface, an image side surface of the focusing lens 20 is a convex surface having a smaller radius of curvature to achieve a light condensing effect. This embodiment takes the object side surface of the focusing lens 20 being a flat surface and the image side surface of the focusing lens 20 being a convex surface as an example.

The present disclosure is not limited to one or more focusing lenses 20. This embodiment takes one focusing lens 20 as an example, and other quantities of focusing lenses 20 refer to movement of one focusing lens 20 in this embodiment to realize inventive concepts of a focal spot position and/or a beam angle, which also belongs to the protection scope of the present disclosure.

Optionally, referring to FIG. 3, the zoom driving module 30 is connected to the focusing lens 20.

Specifically, referring to FIG. 3, the laser module 100 further includes a lens holder 40, and the focusing lens 20 is installed on the lens holder 40. The lens holder 40 is arranged on an outer periphery of the focusing lens 20, and is configured to protect the focusing lens 20 and to be in fitting joint with other structures. The zoom driving module 30 may be arranged on a side of the light path of the laser beam to avoid from blocking the light path of the laser beam. Further, the zoom driving module 30 is arranged on one side of the lens holder 40 and connected to the lens holder 40.

Referring to FIG. 3, the zoom driving module 30 is configured to drive the focusing lens 20 to move to change a focal spot position and/or a beam angle of the laser beam.

Specifically, the zoom driving module 30 is configured to drive the focusing lens 20 to move along an optical axis. Taking an optical axis direction of the focusing lens 20 as a Y direction as an example, the zoom driving module 30 may drive the focusing lens 20 to move in a Y-axis direction, and the movement may be in a +Y direction or a −Y direction. When a position of the focusing lens 20 is moved, the focal spot position of the laser beam changes accordingly, and a focal spot of the laser beam may be projected onto surfaces of base materials to be processed 260 having different thicknesses. When a position of the focusing lens 20 is moved, the focal spot position of the laser beam changes accordingly, and a focal spot of the laser beam may also be moved from a surface of a base material to be processed 260 to a certain depth position inside the base material to be processed 260 when different modes are switched. When a position of the focusing lens 20 is moved, the focal spot position of the laser beam changes accordingly, and a size of the beam angle can also be changed under the condition that a height of the focal spot of the laser beam is constant to realize switching of different modes under the condition that a height of the focal spot of the laser beam is constant. When a position of the focusing lens 20 is moved, the focal spot position of the laser beam changes accordingly, and a height of the focal spot of the laser beam and a size of the beam angle may be changed to realize switching of different processing modes applied on base materials to be processed 260 having different thicknesses/materials.

Driving modes of the zoom driving module 30 include, but are not limited to, magnetic drive, electric drive, manual drive, and the like. Specific examples will be given later.

Referring to FIG. 2, the motion axis drive module 200 is connected to the laser module 100. The motion axis drive module 200 is configured to drive the laser module 100 to move. The motion axis drive module 200 includes, but is not limited to, a guide rail in one direction, guide rails in two directions, guide rails in three directions, guide rails in more than three directions, and the like. The guide rail in one direction includes, but is not limited to, a guide rail in any one of X, Y, Z, R (rotation) and other directions. In this embodiment, the guide rail in one direction may be combined with guide rails in other directions arranged on a processing platform to realize relative motion between the laser module 100 and the base material to be processed in X, Y, Z, R (rotation) and other directions.

The guide rails in two directions include, but are not limited to, guide rails in any two of X, Y, Z, R (rotation) and other directions. In this embodiment, the guide rails in two directions may be combined with guide rails in other directions arranged on a processing platform to realize relative motion between the laser module 100 and the base material to be processed in X, Y, Z, R (rotation) and other directions. The guide rails in three directions or the guide rails in more than three directions may refer to the guide rail in one direction combined with guide rails in other directions arranged on a processing platform to realize an inventive concept of relative motion of the laser module 100 and the base material to be processed in X, Y, Z, R (rotation) and other directions.

Figure 4:
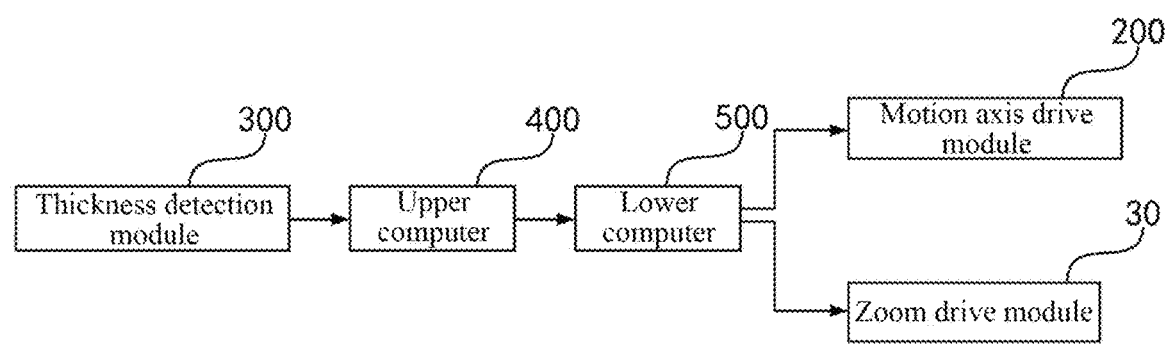
FIG. 4 is a first circuit block diagram of laser processing equipment according to an embodiment of the present disclosure.
Figure 5:
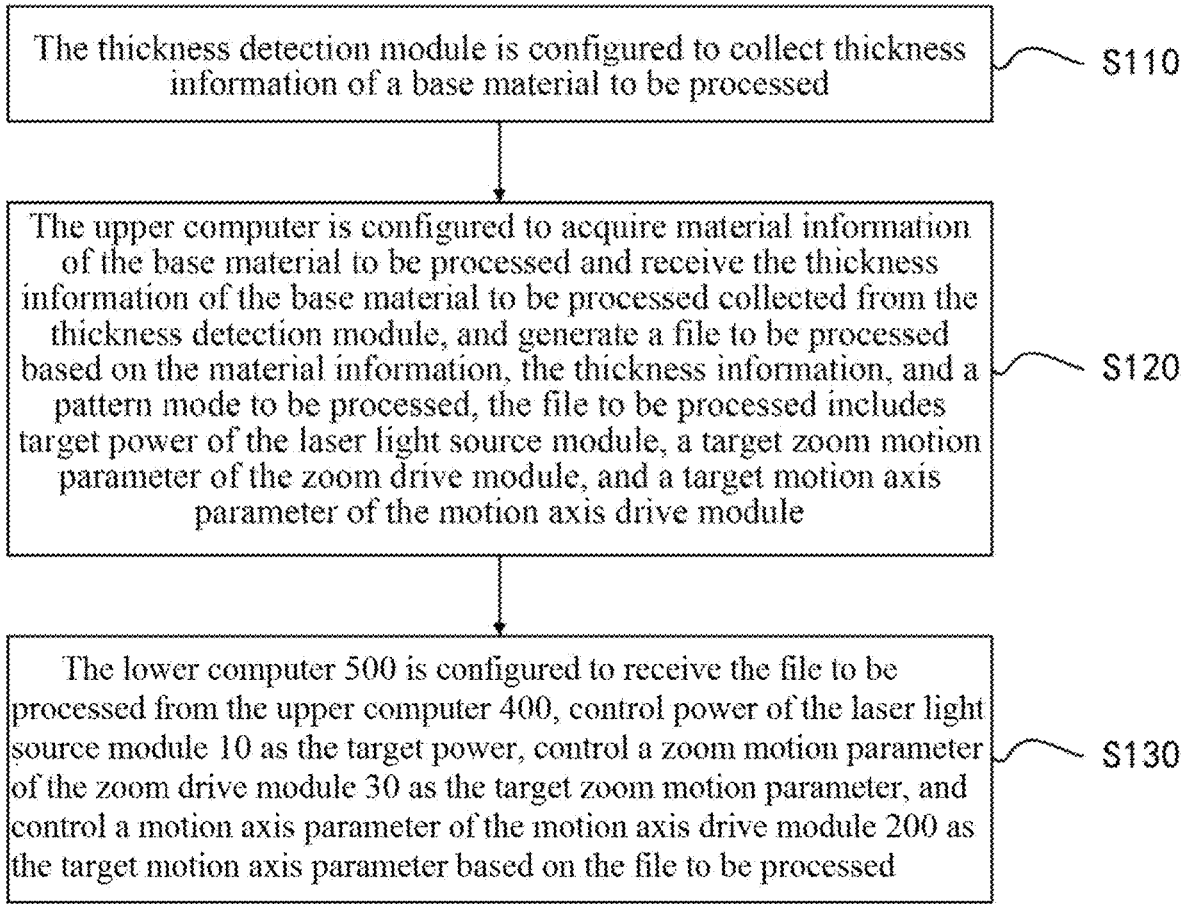
FIG. 5 is a first process flow diagram of laser processing equipment according to an embodiment of the present disclosure.

Referring to FIG. 4 and FIG. 5, in step S110, the thickness detection module 300 is configured to collect thickness information of a base material to be processed.

The thickness detection module 300 may be completely arranged in the laser module 100, or a part of the thickness detection module 300 may be arranged in the laser module 100 and the other part of the thickness detection module 300 may be independent of the laser module 100, or the thickness detection module 300 may be completely arranged outside the laser module 100. The thickness detection module 300 is electrically connected to the upper computer 400. The thickness detection module 300 is configured to collect thickness information of the base material to be processed, and transmit the thickness information of the base material to be processed to the upper computer 400. Parameters to be processed are formed after data analysis of the upper computer 400.

The upper computer 400 refers to a terminal that can directly issue a control command. For example, the upper computer 400 includes, but is not limited to, a terminal having a display screen such as a computer, a notebook computer, or a mobile phone.

Various processing parameters are displayed on a screen of the upper computer 400, and the upper computer 400 communicates with the lower computer 500 through various communication protocols (such as RS232, RS485 and Ethernet) to acquire an operating state of the lower computer 500 and transmit the control command to the lower computer 500. The upper computer 400 runs specific software, controls and monitors the lower computer 500 by entering instructions or parameters, performs complex data processing, decision making and analysis which are presented in an operator-friendly interface. The upper computer 400 further may obtain a production state in real time by monitoring data collected by a sensor on a production line, and performs adjustment and optimization as required.

The lower computer 500 directly controls operation of the laser module 100 and monitors an operation state of the laser module 100. The lower computer 500 includes, but is not limited to, a programmable logic controller, a single-chip microcomputer and a control panel. The lower computer 500 may be installed in the laser module 100.

The lower computer 500 is configured to receive instructions or parameters sent by the upper computer 400 and perform corresponding control operations. In the laser processing equipment 1000, the lower computer 500 controls switching and power adjustment of the laser light source module 10 based on the instructions of the upper computer 400, and feeds back state information of the laser module 100, such as processing speed and other key parameters, to the upper computer 400 for real-time monitoring.

Referring to FIG. 4 and FIG. 5, in this embodiment, the upper computer 400 is electrically connected to the thickness detection module 300.

In step S120, the upper computer 400 is configured to acquire material information of the base material to be processed and receive the thickness information of the base material to be processed collected from the thickness detection module 300, and generate a file to be processed based on the material information, the thickness information and a pattern mode to be processed, the file to be processed includes target power of the laser light source module 10, a target zoom motion parameter of the zoom driving module 30, and a target motion axis parameter of the motion axis drive module 200.

The target power of the laser light source module 10 includes the laser beam power during a current processing operation, and the parameter may be a fixed value or a changing value that changes with time.

The target zoom motion parameter of the zoom driving module 30 includes, but is not limited to, a target motion stroke of the zoom driving module 30. The upper computer 400 determines a laser spot position and a beam angle based on the material information, the thickness information and the pattern mode to be processed. The laser spot position and the beam angle are in one-to-one correspondence to a target position of the focusing lens 20. In this way, the upper computer 400 determines the target position of the focusing lens 20 based on the material information, the thickness information, and the pattern mode to be processed. Based on a current position of the focusing lens 20 fed back from the lower computer 500 and a target motion stroke required for the focusing lens 20 to be moved from the current position to the target position, the upper computer 400 sends a motion stroke instruction to the zoom driving module 30, and controls a stroke of the zoom driving module 30 to be the target motion stroke.

The target motion axis parameter of the motion axis drive module 200 may be formed based on the pattern to be processed.

Specifically, before laser processing, the upper computer 400 is configured to acquire material information of the base material to be processed. In an optional embodiment, the material information of the base material to be processed includes, but is not limited to, input to the upper computer 400 by an operator by selecting an option on a screen display interface of the upper computer 400. In another optional embodiment, the upper computer 400 receives an image of the base material to be processed transmitted by another terminal of the operator or an image of the base material to be processed acquired from an image library. The upper computer 400 acquires material information of the base material to be processed from the image of the base material to be processed.

Generally, in a cutting mode, a high temperature generated by laser focusing instantaneously vaporizes the base material to be processed to achieve cutting of the base material to be processed. Due to different ignition points of the base materials to be processed of different materials, heat affected zones of laser beams around incisions are different. For a base material to be processed with a low ignition point, if laser power is too high and/or a focal spot position is too low, the high temperature generated by laser focusing instantaneously vaporizes the base material to be processed with a low ignition point, and at the same time, the heat affected zone around the incision is expanded, resulting in burn marks and carbonization in a processing region of the base material to be processed with a low ignition point, which seriously affects processing accuracy and molding quality. If the laser power is too small and/or the focal spot position is too high, a cutting effect is poor.

Therefore, in the laser processing equipment 1000 with a high degree of automation according to the present disclosure, the upper computer 400 is provided to acquire material information of the base material to be processed and receive thickness information of the base material to be processed collected from the thickness detection module 300 before processing, and generates a file to be processed based on the material information, the thickness information, and the pattern mode to be processed, so that the generated laser power and focal spot position are suitable without causing problems of severe burn marks and carbonization and poor cutting effect.

Referring to FIG. 4 and FIG. 5, in step S130, the lower computer 500 is configured to receive the file to be processed from the upper computer 400, control power of the laser light source module 10 as the target power, control a zoom motion parameter of the zoom driving module 30 as the target zoom motion parameter, and control a motion axis parameter of the motion axis drive module 200 as the target motion axis parameter according to the file to be processed.

In other words, the lower computer 500 controls the laser light source module 10, the zoom driving module 30 and the motion axis drive module 200 to execute corresponding operations based on the target parameters in the file to be processed.

The laser processing equipment 1000 according to the present disclosure may automatically identify a material and a thickness of the base material to be processed, and determine suitable laser processing parameters based on the material and thickness of the base material to be processed and a pattern mode to be processed without manually inputting or selecting the material of the base material to be processed. The laser processing equipment is higher in degree of automation and more intelligent.

Structures and methods in which the upper computer 400 acquires material information of the base material to be processed include, but are not limited to, the following embodiments.

Figure 6:
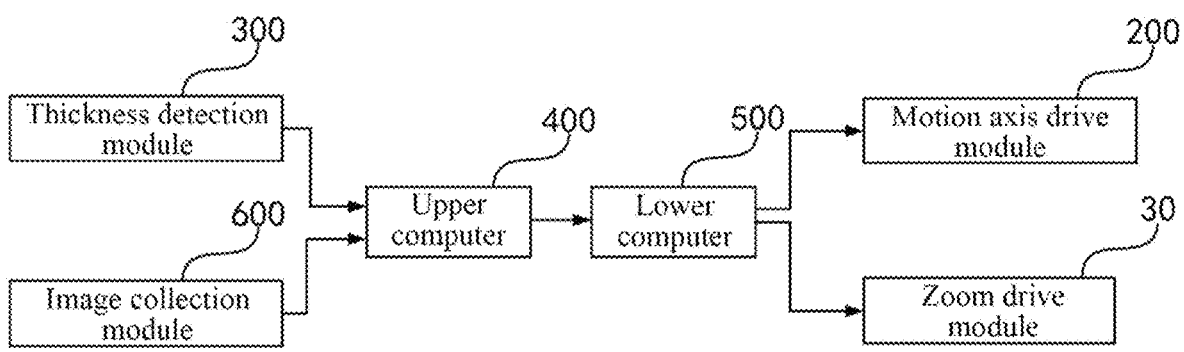
FIG. 6 is a second circuit block diagram of laser processing equipment according to an embodiment of the present disclosure.
Figure 7:
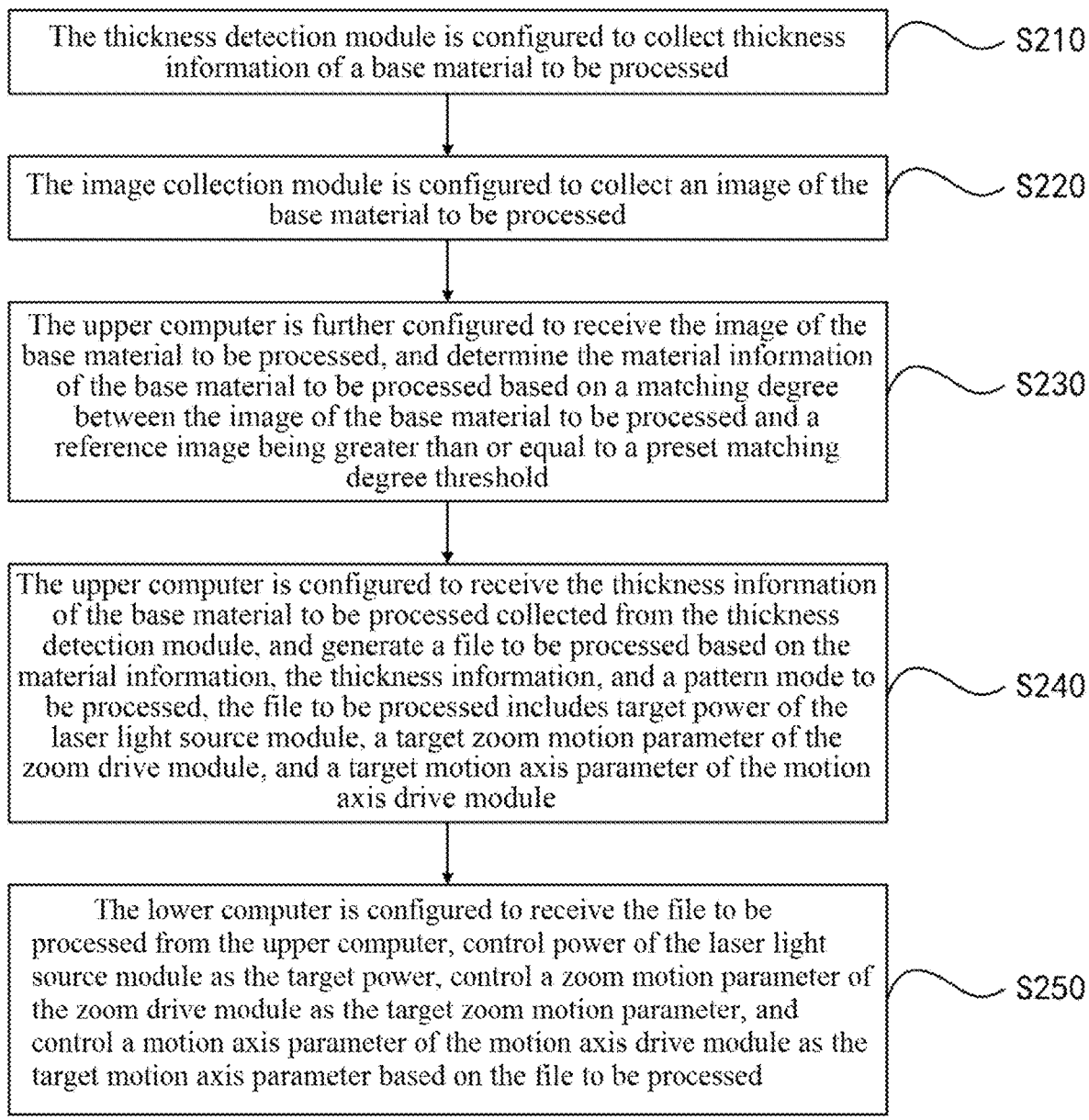
FIG. 7 is a second process flow diagram of laser processing equipment according to an embodiment of the present disclosure.

In a first optional embodiment, referring to FIG. 3, FIG. 6 and FIG. 7, the laser processing equipment 1000 further includes an image collection module 600. The image collection module 600 includes, but is not limited to, a camera module, a scanner, and the like. This embodiment takes a camera module as an example. The camera module (that is, the image collection module 600) may be arranged in the laser module 100. The camera module further may be arranged outside the laser module 100. That is, the camera module and the laser module 100 are independent of each other in structure and position.

Referring to FIG. 6 and FIG. 7, in step S210, the thickness detection module 300 is configured to collect thickness information of a base material to be processed.

In step S220, the image collection module 600 is configured to collect an image of the base material to be processed.

The camera module is arranged above a platform to be processed, and a photographing area of the camera module is partial or all area on the platform to be processed. Specifically, the base material to be processed is arranged on the platform to be processed. The base material to be processed is partially or completely arranged in the photographing area of the camera module. Before processing, the camera module captures an image of the base material to be processed with a photographing instruction, and transmits the image of the base material to be processed to the upper computer 400. The photographing instruction may be generated from the upper computer 400 or when the laser processing equipment 1000 is turned on or in other manners.

In step S230, the upper computer 400 is further configured to receive the image of the base material to be processed, and determine the material information of the base material to be processed based on a matching degree between the image of the base material to be processed and a reference image being greater than or equal to a preset matching degree threshold.

Specifically, data of reference images of multiple known materials are stored in a material reference image library of the upper computer 400. For example, multiple reference images include, but are not limited to, a reference image of poplar plywood, a reference image of basswood plywood, a reference image of an acrylic sheet, or a reference image of leather.

The upper computer 400 is further configured to compare the image of the base material to be processed received from the camera module with the multiple reference images of different materials.

The present disclosure does not specifically limit a preset matching degree threshold. The preset matching degree threshold is related to each different feature matching degree. For example, the preset matching degree threshold is related to a color feature and a surface texture feature.

When the color, surface texture and other features of the image of the base material to be processed is similar to those of a certain reference image among the multiple reference images, for example, the preset matching degree threshold is greater than or equal to 80% (this value is an example value and is not limited to this value), the upper computer 400 may determine that the material of the material to be processed at this time is a material corresponding to the reference image currently compared, and then determine the material of the base material to be processed.

A contrast process of the image of the base material to be processed and multiple images in the material reference image library includes, but is not limited to, image preprocessing, feature extraction, classification and identification. Image collection and preprocessing includes adjusting brightness and contrast of an image, and possible noise removal to ensure that image quality is suitable for subsequent analysis. The feature extraction includes extracting features that can represent a material of an object from a preprocessed image through an algorithm. These features may include visual features such as color, texture, shape, or frequency domain features extracted by mathematical methods such as Fourier transform. Specific steps of classification and identification include, but are not limited to, contrasting extracted features with a database of reference images of known materials, and determining the material of an object by a certain form of matching algorithm (such as a nearest neighbor method).

If the image of the base material to be processed does not match the reference image in the material reference image library, the operator can directly input the material of the base material to be processed on a screen edit page of the upper computer 400.

In step S240, the upper computer 400 is configured to receive the thickness information of the base material to be processed collected from the thickness detection module 300, and generate a file to be processed based on the material information, the thickness information, and a pattern mode to be processed. The file to be processed includes target power of the laser light source module 10, a target zoom motion parameter of the zoom driving module 30, and a target motion axis parameter of the motion axis drive module 200.

In step S250, the lower computer 500 is configured to receive the file to be processed from the upper computer 400, control power of the laser light source module 10 as the target power, control a zoom motion parameter of the zoom driving module 30 as the target zoom motion parameter, and control a motion axis parameter of the motion axis drive module 200 as the target motion axis parameter according to the file to be processed.

Generally, the operator needs to determine the type of the base material to be processed on the upper computer 400 when being uncertain about the material of the base material to be processed or needs to determine each parameter of the laser module 100, during which the problem of wrong type selection or wrong parameter selection is likely to occur, resulting in the problem that an expected figure cannot be processed on the base material to be processed or figure processing is unsuccessful. Based on this, the laser processing equipment 1000 according to this embodiment can receive the image of the base material to be processed through the image of the base material to be processed collected by the image collection module 600, and determine the material information of the base material to be processed based on the matching degree between the image of the base material to be processed and the reference image being greater than or equal to a preset matching degree threshold, so that the laser processing equipment 1000 intelligently determines the material of the base material to be processed without the operator determining the material of the base material to be processed, and generates a suitable file to be processed based on the material of the base material to be processed to process an expected figure on the base material to be processed, thereby avoiding the problem of a figure processing failure, reducing operations on an operator side, and improving automation and intelligence of the laser processing equipment 1000.

Figure 8:
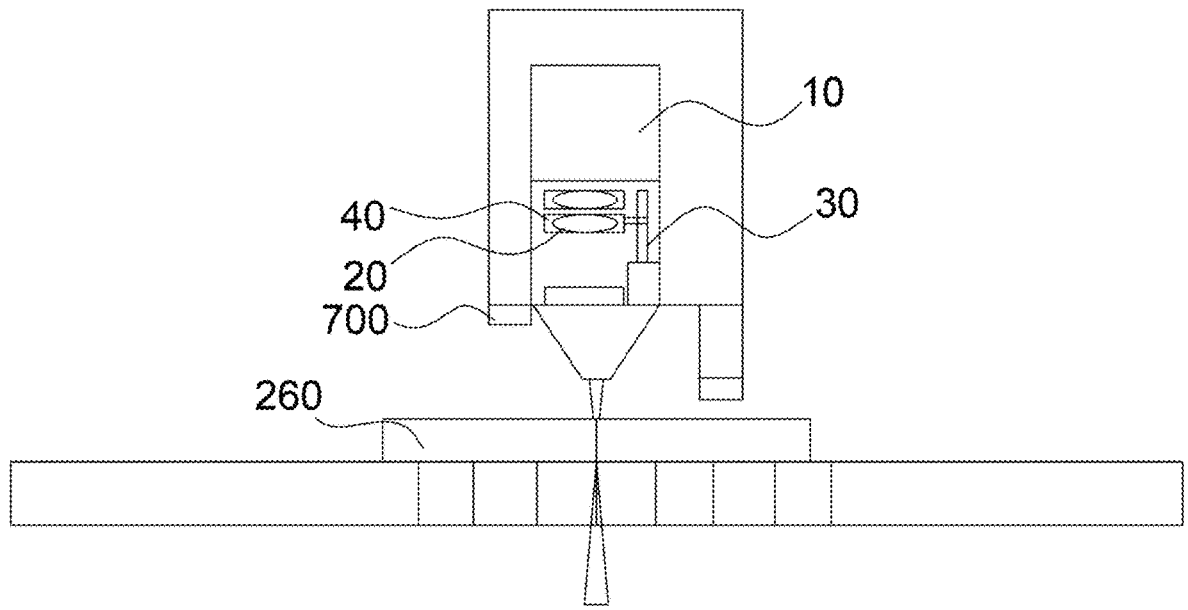
FIG. 8 is a structure diagram of a second laser module according to an embodiment of the present disclosure.
Figure 9:
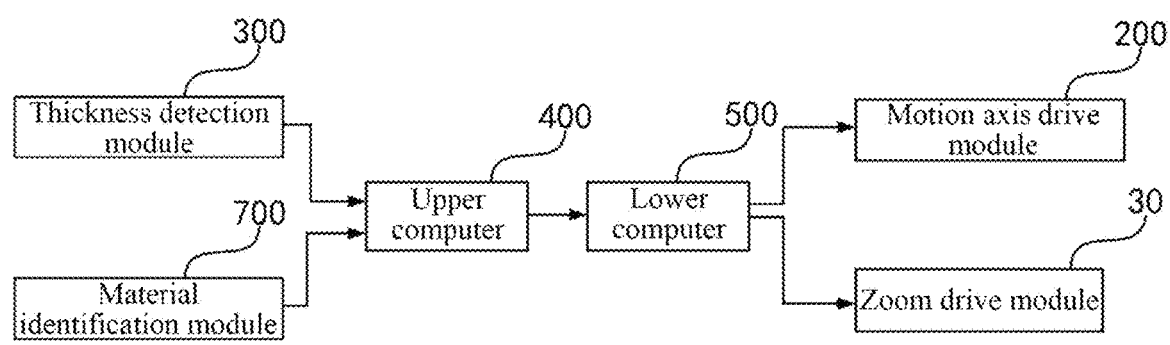
FIG. 9 is a third circuit block diagram of laser processing equipment according to an embodiment of the present disclosure.
Figure 10:
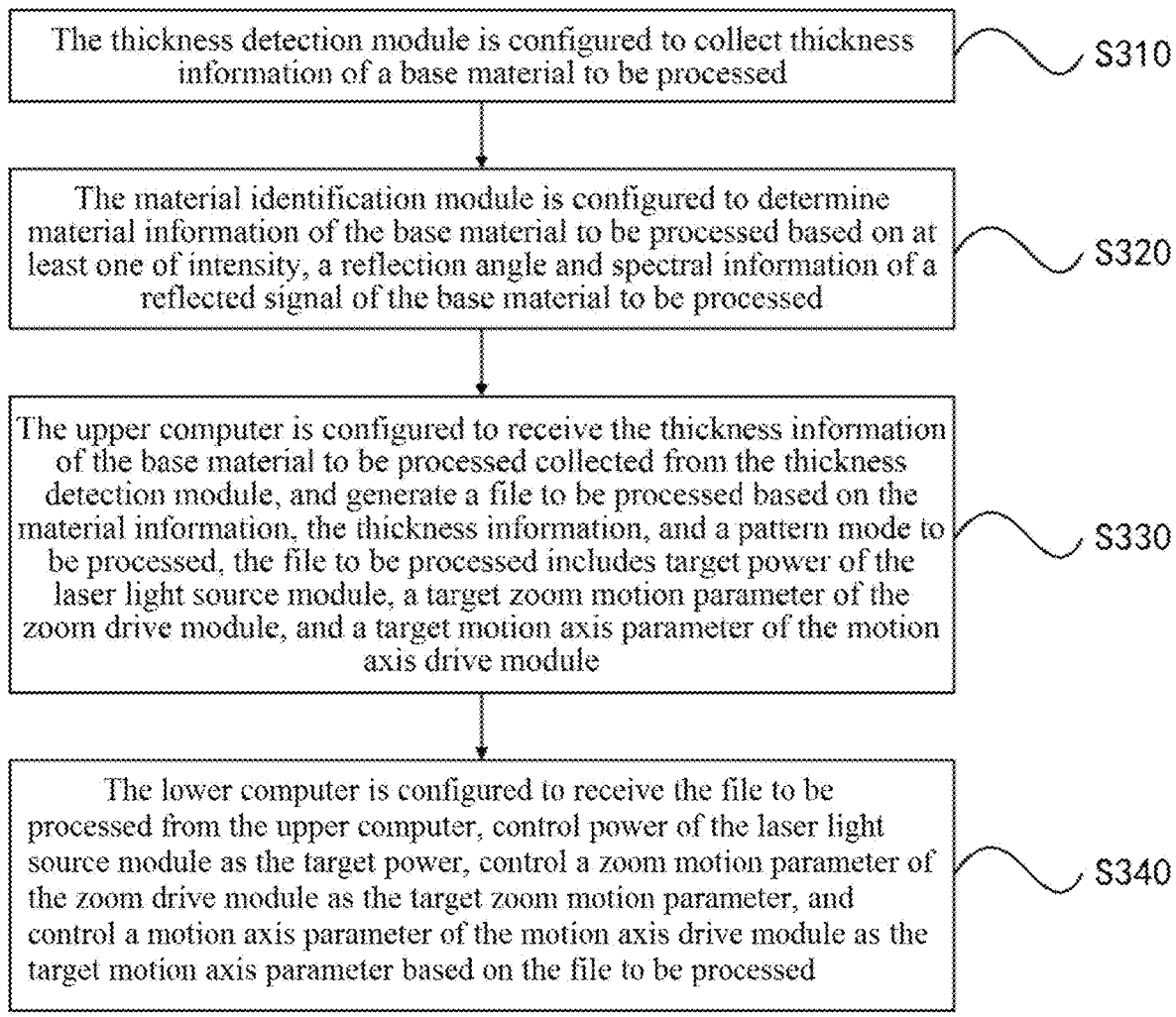
FIG. 10 is a third process flow diagram of laser processing equipment according to an embodiment of the present disclosure.

In a second optional embodiment, referring to FIG. 8, FIG. 9 and FIG. 10, in step S310, the thickness detection module 300 is configured to collect thickness information of a base material to be processed.

The laser processing equipment 1000 further includes a material identification module 700. The material identification module 700 includes, but is not limited to, a photoelectric sensor, a color identification sensor, or the like.

In step S320, the material identification module 700 is configured to determine material information of the base material to be processed based on at least one of intensity, a reflection angle and spectral information of a reflected signal of the base material to be processed.

Optionally, the photoelectric sensor is disposed above the processing platform, and the photoelectric sensor emits an optical signal toward a surface of the base material to be processed. Due to different materials of the objects, reflectivity of the objects to light is also different. The photoelectric sensor may judge the material of the base material to be processed based on light reflection intensity and an emission angle on the surface of the base material to be processed. For example, the photoelectric sensor may acquire the light reflection intensity and the light emission angle of the surface of the base material to be processed, and transmit the light reflection intensity and the emission angle to the upper computer 400. The upper computer 400 contrasts the light reflection intensity and the emission angle of the base material to be processed with a database of light reflection intensity and emission angles of various known materials, and then quickly identifies the material of the base material to be processed.

Optionally, the color identification sensor is disposed above the processing platform, and the color identification sensor emits an optical signal toward the surface of the base material to be processed. The color identification sensor identifies a color of the base material to be processed by collecting spectral information reflected by the surface of the base material to be processed. Generally, the color identification sensor may output different electrical signals to the upper computer 400 based on different colors. The upper computer 400 contrasts the electrical signal of the color identification sensor carried with material information with a database of electrical signals of various known materials, and then quickly identifies the material of the base material to be processed.

When the color of the base material to be processed is in one-to-one correspondence to the material thereof, the material information of the base material to be processed can be acquired by the color identification sensor.

In step S330, the upper computer 400 is configured to receive the thickness information of the base material to be processed collected from the thickness detection module 300, and generate a file to be processed based on the material information, the thickness information, and a pattern mode to be processed, the file to be processed includes target power of the laser light source module 10, a target zoom motion parameter of the zoom driving module 30, and a target motion axis parameter of the motion axis drive module 200.

In step S340, the lower computer 500 is configured to receive the file to be processed from the upper computer 400, control power of the laser light source module 10 as the target power, control a zoom motion parameter of the zoom driving module 30 as the target zoom motion parameter, and control a motion axis parameter of the motion axis drive module 200 as the target motion axis parameter according to the file to be processed.

Generally, the operator needs to determine the type of the base material to be processed on the upper computer 400 when being uncertain about the material of the base material to be processed or needs to determine each parameter of the laser module 100, during which the problem of wrong type selection or wrong parameter selection is likely to occur, resulting in the problem that an expected figure cannot be processed on the base material to be processed or figure processing is unsuccessful. Based on this, the laser processing equipment 1000 according to this embodiment can receive the image of the base material to be processed through the image of the base material to be processed collected by the material identification module 700, and determine the material information of the base material to be processed based on the matching degree between the image of the base material to be processed and the reference image being greater than or equal to a preset matching degree threshold, so that the laser processing equipment 1000 intelligently determines the material of the base material to be processed to be processed without the operator determining the material of the base material to be processed, and generates a suitable file to be processed based on the material of the base material to be processed to process an expected figure on the base material to be processed, thereby avoiding the problem of a figure processing failure, reducing operations on an operator side, and improving automation and intelligence of the laser processing equipment 1000.

In a third optional embodiment, an image of the base material to be processed may be shot by an operator's mobile terminal. In other words, the upper computer 400 establishes communication with the operator's mobile terminal, receives an image of the base material to be processed from the operator's mobile terminal, and then contrasts the image of the base material to be processed with multiple reference images of different materials. Therefore, the upper computer 400 determines material information of the base material to be processed.

In a fourth optional embodiment, the image of the base material to be processed can be directly acquired from the image library of the upper computer 400. Specifically, the operator selects the image of the base material to be processed from the image library of known materials provided by the upper computer 400. Therefore, the upper computer 400 directly determines material information of the base material to be processed.

Figure 11:
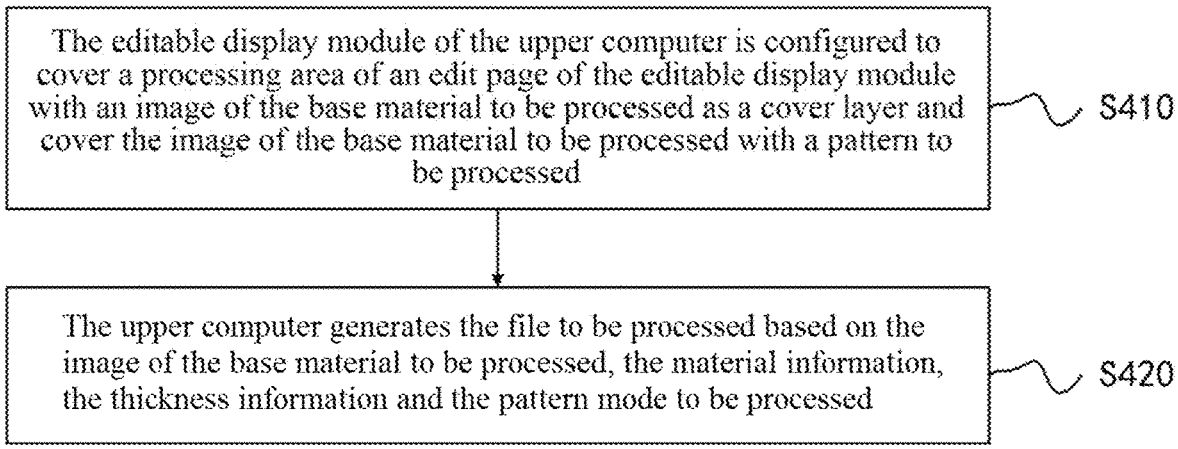
FIG. 11 is a fourth process flow diagram of laser processing equipment according to an embodiment of the present disclosure.

Optionally, referring to FIG. 11, the upper computer 400 further includes an editable display module (not shown). The editable display module includes, but is not limited to, a display screen. A display page on the display screen is editable.

Referring to FIG. 11, in step S410, the editable display module of the upper computer is configured to cover a processing area of an edit page of the editable display module with an image of the base material to be processed as a cover layer and cover the image of the base material to be processed with a pattern to be processed.

In step S420, the upper computer 400 generates the file to be processed based on the image of the base material to be processed, the material information, the thickness information and the pattern mode to be processed.

Specifically, this embodiment may be combined with the first, third and fourth embodiments in which the upper computer 400 acquires material information of the base material to be processed. The editable display module is configured to cover the processing area of the edit page of the editable display module with the image of the base material to be processed transmitted from the image collection module 600 or the mobile terminal of the operator or from the image library of the upper computer 400 as a cover layer.

For example, before image information is covered, the processing area of the edit page is a blank page. After the processing area of the edit page is covered with the image of the base material to be processed, the image of the base material to be processed is presented in the processing area of the edit page.

The image of the base material to be processed may be preprocessed before the image of the base material to be processed is covered, such that a boundary of the base material to be processed corresponds to a boundary of the processing area of the edit page. Alternatively, a boundary of the base material to be processed of the edit page is aligned with a local boundary of the processing area of the edit page.

Further, the image of the base material to be processed is covered with the pattern to be processed. The operator can adjust the area of an actual processing image on the base material to be processed by moving a relative position of the pattern to be processed on the image surface of the base material to be processed.

Further, the upper computer 400 generates target power of a laser light source module 10 and a target zoom motion parameter of the zoom driving module 30 based on the image of the base material to be processed, the material information, the thickness information and the pattern mode to be processed.

The upper computer 400 can determine a starting point position of a laser beam emitted by the laser module and a path of the laser beam based on a relative position of the pattern to be processed on the image surface of the base material to be processed, and then generate a target motion axis parameter of the motion axis drive module 200.

In this embodiment, the editable display module is configured to cover the processing area of the edit page of the editable display module with the image of the base material to be processed transmitted from the image collection module 600 or the mobile terminal of the operator or from the image library of the upper computer 400 as a cover layer, so that the operator may adjust an area of an actually processed image on the base material to be processed by moving the relative position of the pattern to be processed on the image surface of the base material to be processed to determine a pattern size and a pattern position required by the operator. In addition, it is also convenient for the upper computer 400 to determine the starting point position of the laser beam emitted by the laser module and the path of the laser beam based on the relative position of the pattern to be processed on the image surface of the base material to be processed, and then generate the target motion axis parameter of the motion axis drive module 200.

In this embodiment, the upper computer 400 further determines the target zoom motion parameter of the zoom driving module 30 based on the pattern mode to be processed.

Optionally, when the pattern mode to be processed is a line, at this time, the focal spot position is located below the surface of the base material to be processed, and beam angle is small, so as to form a narrow and deep processing trace. In this embodiment, when the pattern mode to be processed is a line, a laser processing mode is defined as a long-focus mode or a cutting mode.

Optionally, when the pattern mode to be processed is filling or image, at this time, the focal spot position is located on the surface of the base material to be processed and a beam angle is large, so as to form a wide and shallow processing trace, and a relatively large processing width is formed to improve processing efficiency. In this embodiment, when the pattern mode to be processed is filling or image, the laser processing mode is defined as a short-focus mode or an engraving mode.

The requirements for the beam are different in the engraving mode and the cutting mode. For example, the laser engraving mode requires a small enough focal spot focused on the surface of the base material to be processed. The smaller the spot, the finer the processing is. The laser cutting mode requires a longer beam Rayleigh length or a smaller beam angle to achieve a certain cutting depth. The beam angle in the cutting mode is smaller than that in the engraving mode.

The target zoom motion parameter in which the laser processing mode is the cutting mode is different from the target zoom motion parameter in which the laser processing mode is the engraving mode. In other words, the position of the focusing lens 20 in which the laser processing mode is the cutting mode is different from the position of the focusing lens 20 in which the laser processing mode is the engraving mode.

Hereinafter, a structure and a detection process of the thickness detection module 300 will be described with reference to the accompanying drawings.

Figure 12:
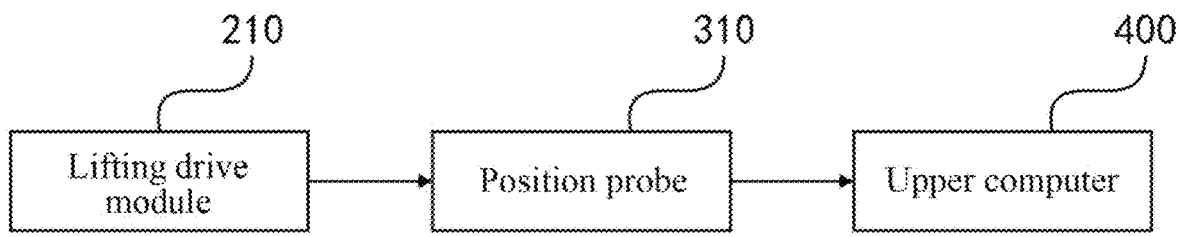
FIG. 12 is a fifth circuit block diagram of laser processing equipment according to an embodiment of the present disclosure.
Figure 13:
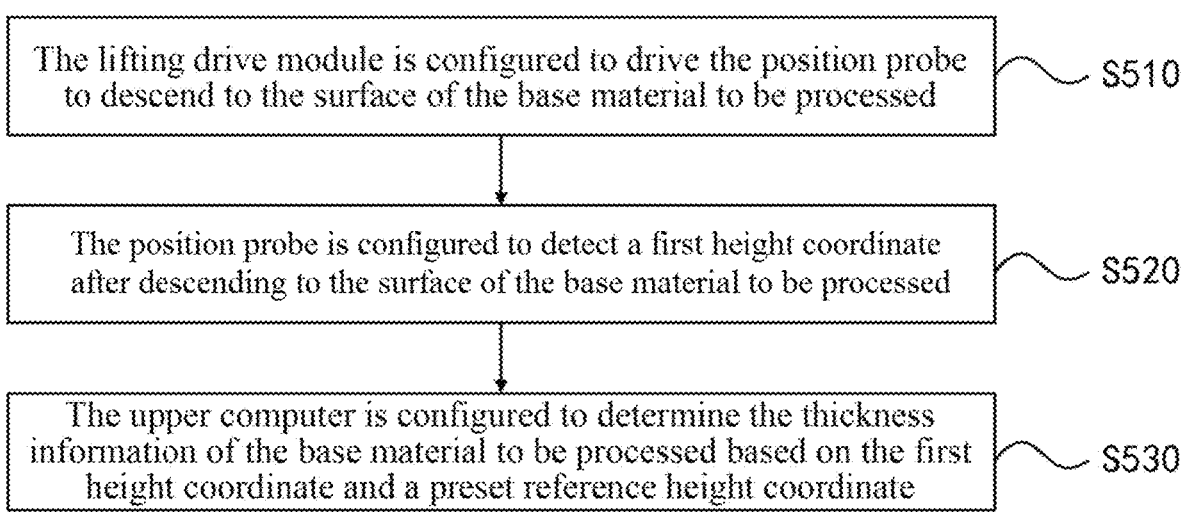
FIG. 13 is a fifth process flow diagram of laser processing equipment according to an embodiment of the present disclosure.
Figure 14:
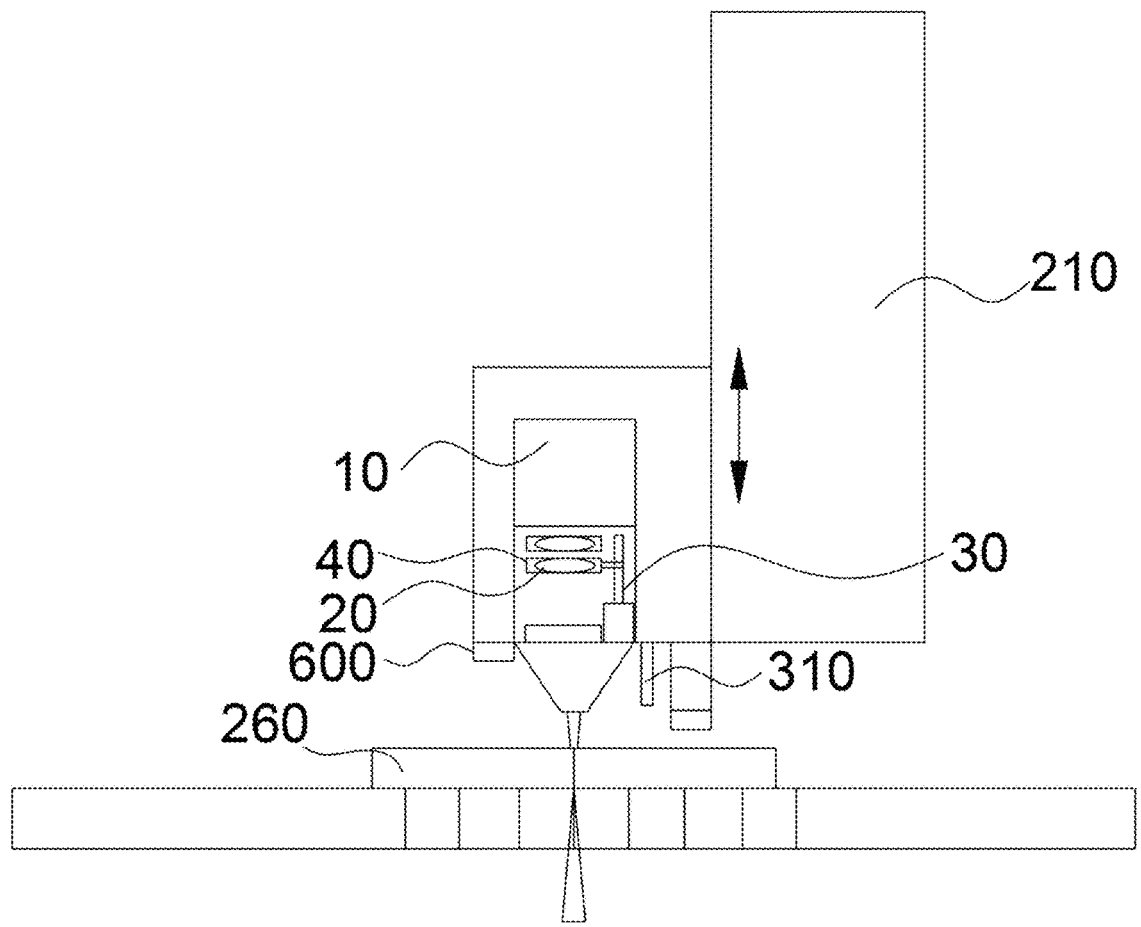
FIG. 14 is a partial structure diagram of laser processing equipment according to an embodiment of the present disclosure.

In a first optional embodiment, referring to FIG. 12, FIG. 13 and FIG. 14, the detection module 300 includes a position probe 310. The position probe 310 includes, but is not limited to, a position sensor. The position probe 310 includes, but is not limited to, a capacitive or magnetically inductive position probe.

Referring to FIG. 12, FIG. 13 and FIG. 14, the motion axis drive module 200 includes a lifting drive module 210.

Optionally, referring to FIG. 12, the lifting drive module 210 is connected to the position probe 310.

Referring to FIG. 12 and FIG. 13, in step S510, the lifting drive module 210 is configured to drive the position probe 310 to descend to the surface of the base material to be processed 260.

In step S520, the position probe 310 is configured to detect a first height coordinate of the base material to be processed 260 after descending to the surface.

In step S530, the upper computer 400 is configured to determine the thickness information of the base material to be processed 260 based on the first height coordinate and a preset reference height coordinate.

Specifically, driving structures of the lifting drive module 210 include, but are not limited to, an air cylinder, a motor, and the like. Transmission structures of the lifting drive module 210 include, but are not limited to, a screw rod, a gear, and the like. Guide structures of the lifting drive module 210 include, but are not limited to, a guide rail, a slide block, a guide slide bar, and the like.

In this embodiment, the lifting drive module 210 drives the position probe 310 to lift relative to the processing platform. In other embodiments, the lifting drive module 210 may also be connected to the processing platform to drive the processing platform to lift and lower relative to the position probe 310. In this embodiment, the lifting drive module 210 and a Z-direction motion axis drive module 200 of the processing platform are the same drive module, thereby realizing multiple purposes, reducing structural members of the laser processing equipment 1000, and reducing the weight thereof.

When the position probe 310 is lowered with the lifting drive module 210 to make contact the surface of the base material to be processed 260, an electrical signal is formed inside the position probe 310 and fed back to the upper computer 400. The upper computer 400 acquires a second position parameter of the lifting drive module 210 when the position probe 310 makes contact with the surface of the base material to be processed 260. At the same time, the upper computer 400 acquires a first position parameter (corresponding to a Z-axis zero position) of the lifting drive module 210 when the position probe 310 makes contact with the surface of the processing platform. The upper computer 400 determines the thickness of the base material to be processed 260 based on the first position parameter and the second position parameter.

In a second optional embodiment, the thickness detection module 300 includes, but is not limited to, a light sensor. When the base material to be processed 260 is not disposed on the processing platform, the light sensor emits a detection signal toward the surface of the processing platform and receives a signal reflected by the surface of the processing platform to acquire a distance between the light sensor and the processing platform, which is defined as a first distance. After the base material to be processed 260 is disposed on the processing platform, the light sensor emits a detection signal toward the surface of the base material to be processed 260 and receives a signal reflected by the surface of the base material to be processed 260 to acquire a distance between the light sensor and the base material to be processed 260, which is defined as a second distance. A difference between the first distance and the second distance is a thickness of the base material to be processed 260.

Generally, in domestic laser processing equipment 1000, when processing parameters are set for the laser processing equipment 1000, the thicknesses of the base materials to be processed 260 have a relatively small difference therebetween, so the different processing parameters are not set based on different thicknesses. However, technicians of the present disclosure find that in the cutting mode, the energy distribution of laser beams in the base materials 260 to be processed with different thicknesses is different, and then different line processing effects or different incision traces are formed. For the base material to be processed 260 having a relatively thin thickness, it is easy to cause heavier incision traces and obvious burn marks and carbonized areas. In the base material to be processed 260 having a relatively thick thickness, problems such as insufficiency in cut depth are likely to occur.

In this embodiment, the thickness detection module 300 is provided, and before the file to be processed is formed, the thickness detection module 300 detects the thickness of the base material to be processed 260, so as to generate different focal spot positions based on the thickness of the base material to be processed 260, obtain more accurate files to be processed for different thicknesses, form surface image processing or filling, or form lines with good cutting traces. In this embodiment, the operator does not need to manually detect the thickness of the base material to be processed 260, thereby improving the processing effect or filling effect of the surface image of the laser processing equipment 1000, or forming a line effect with good cutting traces, and further increasing degrees of automation and intelligence of the laser processing equipment 1000.

In this embodiment, an input port for thickness selection or input is reserved on the edit page of the upper computer 400, so that the operator can also input the thickness of the base material to be processed 260 in the edit page, so that the thickness detected by the thickness detection module 300 can be corrected or the operator can directly generate a file to be processed by inputting the thickness of the base material to be processed 260 in the edit page.

Figure 15:
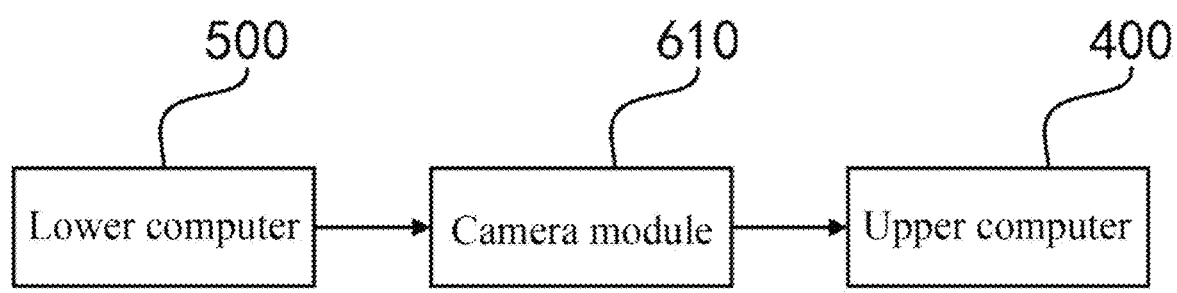
FIG. 15 is a sixth circuit block diagram of laser processing equipment according to an embodiment of the present disclosure.
Figure 16:
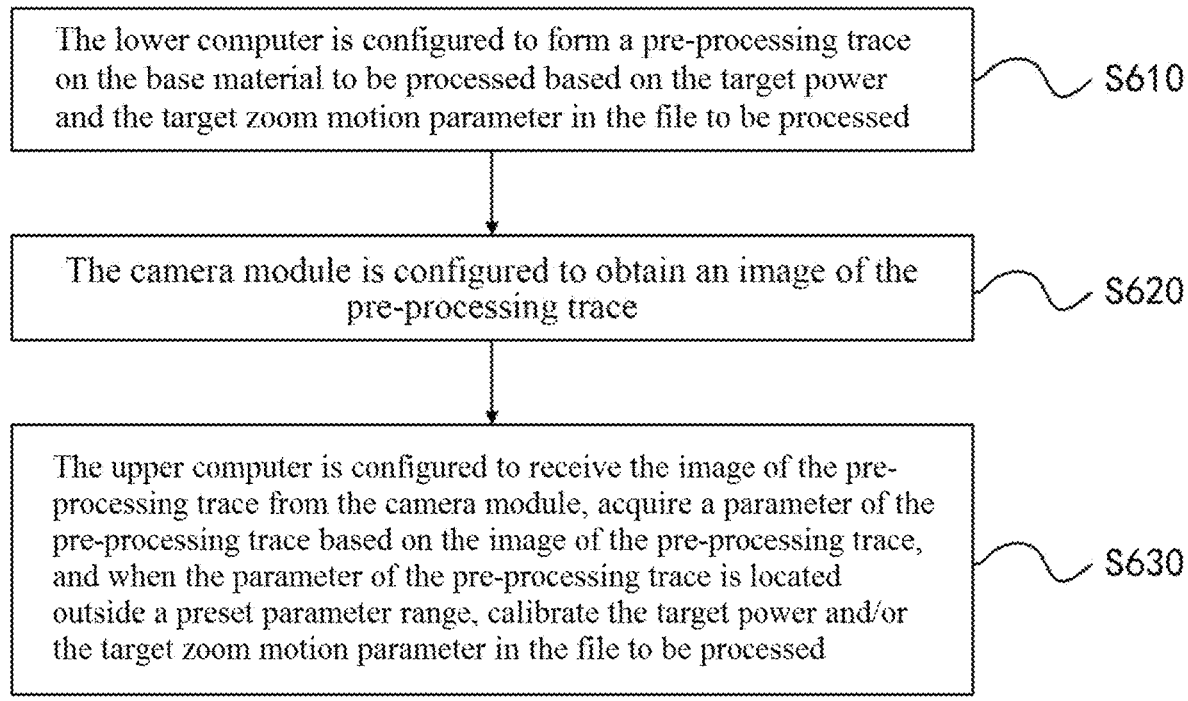
FIG. 16 is a sixth process flow diagram of laser processing equipment according to an embodiment of the present disclosure.

Optionally, referring to FIG. 15 and FIG. 16, in step S610, the lower computer 500 is configured to form a pre-processing trace on the base material to be processed 260 based on the target power and the target zoom motion parameter in the file to be processed.

In other words, after the file to be processed is generated, the laser processing equipment 1000 first performs pre-processing on the base material to be processed 260 based on the target power and the target zoom motion parameter in the file to be processed, and the pre-processing includes, but is not limited to, dotting, drawing a line, and the like, so as to verify whether the target power and the target zoom motion parameter in the file to be processed are appropriate.

Referring to FIG. 15 and FIG. 16, the laser processing equipment 1000 further includes a camera module 610.

In step S620, the camera module 610 is configured to obtain an image of the pre-processing trace.

Optionally, the camera module 610 may be the foregoing image collection module 600. In other words, the foregoing image collection module 600 can not only collect an image of the base material to be processed 260, but also collect whether the pre-processing trace is within a suitable range to determine whether the target power and the target zoom motion parameter in the current file to be processed is suitable. Steps S610 to S630 in FIG. 16 are referred to.

In a first embodiment, in step S630, the upper computer 400 is configured to receive the image of the pre-processing trace from the camera module 610, acquire a parameter of the pre-processing trace based on the image of the pre-processing trace, and when the parameter of the pre-processing trace is located outside a preset parameter range, calibrate the target power and/or the target zoom motion parameter in the file to be processed.

Optionally, the parameters of the pre-processed trace include, but are not limited to, the width of the heat affected zone of the notch, and the like. If the parameter of the pre-processing trace is less than a minimum value in the preset parameter range, it indicates that the pre-processing trace is too narrow or too shallow, the upper computer 400 can calibrate the target power and/or the target zoom motion parameter in the file to be processed, for example, increase the target power in the file to be processed by the preset power, or adjust the target zoom motion parameter to move the laser focal spot down by a preset distance. If the parameter of the pre-processing trace is greater than a maximum value in the preset parameter range, it indicates that the pre-processing trace is too wide or too deep, the upper computer 400 can calibrate the target power and/or the target zoom motion parameter in the file to be processed, for example, decrease the target power in the file to be processed by the preset power, or adjust the target zoom motion parameter to move the laser focal spot down by a preset distance. If the parameters of the pre-processing trace are within the preset parameter range, processing can be performed based on the current file to be processed.

Then, a second pre-processing trace is formed on the base material to be processed 260 according to the file to be processed after calibration, the camera module 610 is configured to acquire an image of the second pre-processing trace, the parameter of the second pre-processing trace is obtained based on the image of the second pre-processing trace, and then when the parameter of the second pre-processing trace is beyond the preset parameter range, the target power and/or the target zoom motion parameter in the file to be processed are calibrated, until the parameter of the pre-processing trace is within the preset parameter range.

In a second embodiment, the operator judges whether the trace is an expected pre-processing trace based on the pre-processing trace, and an input port for selecting or inputting various parameters in the file to be processed is reserved on the edit page of the upper computer 400, so that the operator can also input various parameters in the file to be processed in the edit page, and the operator can correct the file to be processed based on the pre-processing trace or the operator can directly generate the file to be processed by inputting parameters in the edit page.

In a third embodiment, the operator presets a line width, such as 2 mm, on the upper computer 400. The upper computer 400 is configured to receive the image of the pre-processing trace from the camera module 610, acquire the parameters (including but not limited to an incision width, and the like) of the pre-processing trace based on the image of the pre-processing trace, and judge whether the parameter of the pre-processing trace is equal to the preset line width, if unequal, can calibrate the target power and/or the target zoom motion parameter in the file to be processed according to the first embodiment.

According to this embodiment, the laser processing equipment 1000 can verify whether the target power and/or the target zoom motion parameter in the file to be processed are suitable based on the line width preset by the operator, thereby improving the intelligence of the laser processing equipment 1000 and obtaining processing patterns desired by the operator more accurately.

A working process of the laser processing equipment 1000 described above includes, but is not limited to, the following operations:

Step 1: turning on the laser processing equipment 1000, putting, by the operator, the base material to be processed 260 on the processing platform; automatically taking, by the camera module, a photo of the base material to be processed 260, transmitting the photo back to the upper computer 400, and determining and identifying, by the upper computer 400, wood, plastic, leather, and the like based on the information such as surface texture and color of the base material to be processed 260. The upper computer 400 treats the surface of the base material to be processed 260 and covers the processing area of the edit page as a cover layer.

Step 2: driving, by an XY-axis drive module, the laser module 100 to move over the surface of the base material to be processed 260, and then driving, by a Z-axis drive module, the laser module 100 to sink, so that the position probe 310 makes contact with the surface of the base material to be processed 260. Where the thickness of the base material to be processed 260 based on a Z-axis zero position preset by the lower computer 500 and a measurement position of the position probe 310 is calculated.

Step 3: adding, by the operator, an engraving pattern on the edit page of the upper computer 400, clicking to start processing; judging, by the upper computer 400, zoom modes (a long-focus mode, and a short-focus mode) based on the engraving pattern mode (line, filling and pictures) added by the operator in combination with a first preset mapping relationship table, and then generating corresponding processing parameters based on the material and thickness of the base material to be processed 260 in combination with a second preset mapping relationship table. Where if the operator does not satisfy the preset parameters, the upper computer 400 can amend the preset parameters on a display interface, click a processing confirmation button of the upper computer 400, and the upper computer 400 sends the engraving file to the lower computer 500 for an engraving task.

Step 4: receiving, by the lower computer 500, the engraving task sent by the upper computer 400, reading a processing mode instruction to control moving speeds and distances of X-axis, Y-axis and Z-axis, laser beam power and the zoom driving module 30 to complete the engraving task. Where, a duty ratio of each laser light source in the laser light source module 10 is controlled based on the laser power determined above, the target position of the focusing lens 20 is determined based on the spot size, the Rayleigh length and the focal spot position in Step 3, and the zoom driving module 30 is controlled to move the focusing lens 20 to the target position.

The following steps may be included between the Step 3 and the Step 4:

a pre-processing step: emitting, by the laser light source module 10, laser light based on set power, and performing pre-processing based on a preset processing trajectory (for example, dotting and routing) to form a pre-processing trace; acquiring, by the camera module, the preset processing trajectory (collection dots or line traces), feeding back a feedback signal to the upper computer 400 based on the collection dots or line traces, and adjusting, by the upper computer 400, parameters such as the laser power or the focus spot position based on the pre-processing trace. In addition, the operator can adjust the parameters such as the laser power or the focal spot position based on the pre-processing trace.

The following embodiments of the present disclosure also determine different zoom modes based on different pattern modes, which correspond to different positions of the focusing lens 20 (zoom control modes).

Referring to Table 1, which is the first preset mapping relationship table according to the present disclosure.

TABLE 1

| Pattern modes | Processing manners | Zoom control |
| --- | --- | --- |
| Lines | Cutting mode | Long-focus mode |
| Filling | Engraving mode | Short-focus mode |
| Pictures | Engraving mode | Short-focus mode |

When the image mode to be processed received by the upper computer 400 is a line, the upper computer 400 determines that the processing mode is a cutting mode. At this time, the zoom control mode of the focusing lens 20 is a long-focus mode. At this time, a length between the focusing lens 20 and the focal spot is a first length, and the beam angle is a first beam angle. When the image mode to be processed received by the upper computer 400 is filling or pictures, the upper computer 400 determines that the processing mode is an engraving mode. At this time, the zoom control mode of the focusing lens 20 is a short-focus mode. At this time, a length between the focusing lens 20 and the focal spot is a second length, and the beam angle is a second beam angle. The second beam angle is greater than the first beam angle, and the second length is less than the first length.

When the pattern mode to be processed includes an engraving mode, the upper computer 400 is configured to determine that an object distance of the target zoom motion parameter corresponding to the focusing lens 20 is a first height coordinate based on the thickness information of the base material to be processed 260. When the object distance of the focusing lens 20 is the first coordinate height, a focal spot height of the laser beam is the thickness of the base material to be processed 260.

Specifically, when the upper computer 400 receives that the pattern mode to be processed includes filling or pictures, the upper computer 400 determines that the current processing mode is the engraving mode. The focal spot height of the laser beam in the engraving mode is the thickness of the base material to be processed 260. In other words, in the engraving mode, because the laser beam is processed on the surface of the base material to be processed 260, the focal spot height of the laser beam is the thickness of the base material to be processed 260, so as to ensure engraving accuracy and highest energy density.

Further, the upper computer 400 is configured to determine a focal spot height of the laser beam based on the thickness of the base material to be processed 260 obtained in the above-described manner, and then configure the target zoom motion parameter. The zoom driving module 30 adjusts a position of the focusing lens 20 to be located at the target position after moving based on the target zoom motion parameter, so that the focal spot height of the laser beam is the thickness of the base material to be processed 260, and the focal spot of the laser beam is located on the surface of the base material to be processed 260 to ensure engraving accuracy and highest energy density.

Because characteristics and densities of the base material to be processed 260 of different materials are different, the upper computer 400 acquires the material information of the base material to be processed 260 by the foregoing method, and then configures different laser power for the base material to be processed 260 of different materials to generate corresponding files to be processed.

Referring to Table 2, which is a table of some parameters in the files to be processed for different materials, different thicknesses and different processing modes:

TABLE 2

| Serial numbers | Materials | Thicknesses | Pattern modes Engraving modes | Cutting modes | Engraving speed | Power ratios | Engraving interval | Focal position | Zoom control | Air-assisted airflow |
|---|---|---|---|---|---|---|---|---|---|---|
| 1 | Basswood plywood | Larger than 1 mm | Filling/pictures | | 20000 mm/min | 80% | 0.1 mm | Base material surface (height of light spot being base material thickness) | Short-focus mode | 3 L/min |
| 2 | Basswood plywood | Less than 3 mm | | Lines | 1000 mm/min | 100% | — | Base material surface (height of light spot being base material thickness) | Long-focus mode | 21 L/min |
| 3 | Basswood plywood | 4 mm | | Lines | 1000 mm/min | 100% | — | Sinking from the base material surface by 2 mm (height of light spot being about 2 mm) | Long-focus mode | 21 L/min |
| 4 | Basswood plywood | 5 mm | | Lines | 1000 mm/min | 100% | — | Sinking from the base material surface by 2.5 mm (height of light spot being about 2.5 mm) | Long-focus mode | 21 L/min |
| 5 | Poplar plywood | Larger than 1 mm | Filling/pictures | | 20000 mm/min | 100% | 0.1 mm | Base material surface | Short-focus mode | 3 L/min |
| 6 | Poplar plywood | Less than 3 mm | | Lines | 600 mm/min | 100% | — | Base material surface | long-focus mode | 21 L/min |

TABLE 2-continued

| Serial numbers | Materials | Thicknesses | Pattern modes | | | | | Focal position | Zoom control | Air-assisted airflow |
| --- | --- | --- | --- | --- | --- | --- | --- | --- | --- | --- |
| | | | Engraving modes | Cutting modes | Engraving speed | Power ratios | Engraving interval | | | |
| 7 | | 4 mm | | Lines | 600 mm/min | 100% | — | Sinking from the base material surface by 2 mm | Long-focus mode | 21 L/min |
| 8 | | 5 mm | | Lines | 600 mm/min | 100% | — | Sinking from the base material surface by 2.5 mm | Long-focus mode | 21 L/min |
| 9 | Acrylic sheet | Larger than 1 mm | Filling/pictures | | 20000 mm/min | 50% | 0.1 mm | Base material surface | Short-focus mode | 3 L/min |
| 10 | Leather | Larger than 0.5 mm | Filling/pictures | | 6000 mm/min | 30% | 0.1 mm | Base material surface | Short-focus mode | 3 L/min |
| 11 | Leather | Less than 2 mm | | Lines | 2000 mm/min | 100% | — | Base material surface | Long-focus mode | 21 L/min |

Referring to the serial numbers of 1, 5, 9, and 10 in Table 2, the upper computer 400 is further configured to determine that the target power is the first power when the material information of the base material to be processed 260 is a first material.

When the material information of the base material to be processed 260 is a second material, the target power is determined to be second power.

When the material information of the base material to be processed 260 is a third material, the target power is determined to be third power.

When the material information of the base material to be processed 260 is a fourth material, the target power is determined to be fourth power.

An ignition point of the fourth material, an ignition point of the third material, an ignition point of the second material, and an ignition point of the first material are increased sequentially. The first power, the second power, the third power and the fourth power are decreased sequentially.

Optionally, the first power includes, but is not limited to, 90% to 100% of total power of the laser light source module 10. Specifically, a laser light source control signal input from the lower computer 500 to the laser light source module 10 is a pulse signal, and a duty ratio of the laser light source control signal is controlled to be 90% to 100%, so that the first power is controlled to be 90% to 100% of total power of the laser light source module 10.

For example, referring to the serial number of 1 in Table 2, the base material to be processed 260 of the first material is basswood plywood. After the upper computer 400 acquires that the base material to be processed 260 is basswood plywood in the above manner, the laser power for the basswood plywood is configured to be the first power, and a corresponding file to be processed is generated. For example, the first power is 100% of the total power. The total power is, for example, 20 w.

Optionally, the second power includes, but is not limited to, 70% to 90% of total power of the laser light source module 10. Specifically, a laser light source control signal input from the lower computer 500 to the laser light source module 10 is a pulse signal, and a duty ratio of the laser light source control signal is controlled to be 70% to 90%, so that the second power is controlled to be 70% to 90% of total power of the laser light source module 10.

For example, referring to the serial number of line 5 in Table 2, the base material to be processed 260 of the second material is poplar plywood. After the upper computer 400 acquires that the base material to be processed 260 is poplar plywood in the above manner, the laser power for the poplar plywood is configured to be the second power, and a corresponding file to be processed is generated. For example, the second power is 80% of the total power.

Optionally, the third power includes, but is not limited to, 40% to 70% of total power of the laser light source module 10. Specifically, a laser light source control signal input from the lower computer 500 to the laser light source module 10 is a pulse signal, and a duty ratio of the laser light source control signal is controlled to be 40% to 70%, so that the third power is controlled to be 40% to 70% of total power of the laser light source module 10.

For example, referring to the serial number of 9 in Table 2, the base material to be processed 260 of the third material is Acrylic plywood. After the upper computer 400 acquires that the base material to be processed 260 is Acrylic plywood in the above manner, the laser power for the Acrylic plywood is configured to be the third power, and a corresponding file to be processed is generated. For example, the third power is 50% of the total power.

Optionally, the fourth power includes, but is not limited to, 10% to 40% of total power of the laser light source module 10. Specifically, a laser light source control signal input from the lower computer 500 to the laser light source module 10 is a pulse signal, and a duty ratio of the laser light source control signal is controlled to be 10% to 40%, so that the fourth power is controlled to be 10% to 40% of total power of the laser light source module 10.

For example, referring to the serial number of 10 in Table 2, the base material to be processed 260 of the fourth material is leather. After the upper computer 400 acquires that the base material to be processed 260 is leather in the above manner, the laser power for the Acrylic plywood is configured to be the fourth power, and a corresponding file to be processed is generated. For example, the fourth power is 30% of the total power.

In the present disclosure, a duty ratio of the laser light source module 10 can be adjusted to adjust output power of the laser light source module 10, and then the surfaces of the base materials to be processed 260 of different materials can be processed for engraving. The laser processing equipment 1000 according to the present disclosure can automatically detect the material and thickness of the base material to be processed 260, correspondingly generate the target power of the laser light source module 10 based on the material of the base material to be processed 260, and then correspondingly determine the target zoom motion parameter of the zoom driving module 30 based on the thickness of the base material to be processed 260, and then correspondingly determine the position of the focusing lens 20, so that the focal spot height of the laser beam is the thickness of the base material to be processed 260. The focal spot of the laser beam is located on the surface of the base material to be processed 260 so as to ensure engraving accuracy and highest energy density.

Further, in the engraving mode, before the upper computer 400 generates the file to be processed for the base material to be processed 260, the upper computer 400 further judges whether the acquired thickness of the base material to be processed 260 is greater than or equal to a first preset thickness value, and if so, generates the file to be processed in the foregoing manner. For the base material to be processed 260 of the first material, the second material and the third material, the first preset thickness value is 1 mm (this data is an example). For the base material to be processed 260 of the fourth material, the second preset thickness value is 0.5 mm (this data is an example).

The file to be processed in the engraving mode also includes engraving speed.

In this embodiment, the engraving speed in the engraving mode is not specifically limited. For example, the engraving speed in this embodiment may be different based on different materials. For example, for the base material to be processed 260 of the first material, the second material and the third material, the engraving speed is 15000 to 25000 mm/min, such as 20000 mm/min (this data is an example). For the base material to be processed 260 of the fourth material, the engraving speed is 5000 to 7000 mm/min, such as 6000 mm/min (this data is an example).

The file to be processed in the engraving mode further includes an engraving gap.

In this embodiment, the engraving gap in the engraving mode is not specifically limited. For the base material to be processed 260 of the first material, the second material, the third material and the fourth material, the engraving gap is 0.05 to 0.2 mm, such as 0.1 mm (this data is an example).

The parameters in the file to be processed in the engraving mode also include an air-assisted gas flow.

In this embodiment, the air-assisted gas flow in the engraving mode is not specifically limited. For the base materials to be processed 260 of the first material, the second material, the third material and the fourth material, the air-assisted gas flow is 2-4 L/min, such as 3 L/min (this data is an example).

Referring to the serial numbers of 2, 6 and 11 in table 2, in the cutting mode, when the laser beam cuts the base material to be processed 260, for the base material to be processed 260 with a low ignition point, the high temperature generated by laser focusing instantaneously vaporizes the base material to be processed 260 with a low ignition point, and at the same time, the heat affected zone around the incision is expanded, resulting in burn marks and carbonization in a processing region of the base material to be processed 260 with a low ignition point, which seriously affects processing accuracy and molding quality and restricts the popularization and application of laser cutting technologies.

In view of the above problems, the laser processing equipment 1000 according to the present disclosure performs optical simulation from a perspective of energy distribution of the spatial light beam according to the base material to be processed 260 of different materials, and finally achieves light beam energy distribution in an optimal cutting scene corresponding to the base material to be processed 260 of different materials by balancing the focal spot and the Rayleigh length, and an optical design is completed, which will be described below by specific embodiments.

Optionally, when the pattern mode to be processed includes a cutting mode, the upper computer 400 is configured to determine that the target power is greater than or equal to preset power. The preset power includes, but is not limited to, 100% to 70% of total power, so as to facilitate stronger intensity of the laser beam, thereby improving a cutting effect, reducing a heat affected zone of the incision and a cutting rate. In this embodiment, the preset power is 100%.

In an optional embodiment, the upper computer 400 is configured to determine that the object distance of the target focusing motion parameter corresponding to the focusing lens 20 is a second coordinate height based on the material information of the base material to be processed 260 being a target material and the thickness of the base material to be processed 260 being smaller than or equal to a first thickness. When the object distance of the focusing lens 20 is the second coordinate height, the focal spot height of the laser beam is the thickness of the base material to be processed 260.

Optionally, the target material includes any one of a first material, a second material, and a fourth material. In other words, when the upper computer 400 detects that the material information of the base material to be processed 260 is basswood plywood or poplar plywood or leather, in the cutting mode, the object distance of the target zoom motion parameter corresponding to the focusing lens 20 is determined to be a second coordinate height based on the thickness of the base material to be processed 260 being smaller than or equal to a first thickness. When the object distance of the focusing lens 20 is the second coordinate height, the focal spot height of the laser beam is the thickness of the base material to be processed 260.

The first thickness is a relatively thin thickness. Based on an energy distribution angle of the spatial light beam, when the base material to be processed 260 with a thin thickness is cut by using the laser beam, and the laser power is 100% of total power, the upper computer 400 controls the object distance of the target zoom motion parameter corresponding to the focusing lens 20 to be a second coordinate height, so that the focal spot of the laser beam is located on the surface of the base material to be processed 260. The heat affected zone when the laser beam is irradiated on the surface of the base material to be processed 260 may cover the entire thickness. Therefore, when the thickness of the base material to be processed 260 is less than or equal to the first thickness, the laser beam irradiated on the surface of the base material to be processed 260 may increase cutting efficiency and avoid incision carbonization or reduce incision carbonization traces.

Optionally, referring to serial numbers of 2 and 6 in Table 2, for the first material and the second material, the first thickness is 3 mm. In other words, when the upper computer 400 detects that the material information of the base material to be processed 260 is basswood plywood or poplar plywood, in the cutting mode, based on the thickness of the base material to be processed 260 being 2 mm (less than 3 mm), the object distance of the target zoom motion parameter corresponding to the focusing lens 20 is determined to be a second coordinate height. When the object distance of the focusing lens 20 is the second coordinate height, the focal spot height of the laser beam is the thickness of the base material to be processed 260. That is, when the object distance of the focusing lens 20 is the second coordinate height, the focal spot height of the laser beam is 2 mm.

Optionally, referring to the serial number of line 11 in Table 2, for the fourth material, the first thickness is 2 mm. In other words, when the upper computer 400 detects that the material information of the base material to be processed 260 is leather, in the cutting mode, based on the thickness of the base material to be processed 260 being 1.5 mm (less than 2 mm), the object distance of the target zoom motion parameter corresponding to the focusing lens 20 is determined to be a second coordinate height. When the object distance of the focusing lens 20 is the second coordinate height, the focal spot height of the laser beam is the thickness of the base material to be processed 260. That is, when the object distance of the focusing lens 20 is the second coordinate height, the focal spot height of the laser beam is 1.5 mm.

The laser processing equipment 1000 according to this embodiment can form a file to be processed based on the automatically acquired parameters such as materials, thicknesses and pattern modes. Because different ignition points of different materials are considered for the file to be processed, the requirements for laser power are different. Different processing requirements of different pattern modes on different materials are considered, so the laser power and focal spot height are different. Different processing requirements of different pattern modes on different materials with different thicknesses are considered, and then a file to be processed that can be generated based on different materials, thicknesses, pattern modes and other considerations is formed. The file to be processed enables the laser processing equipment 1000 to determine a better laser power and a suitable position of the focusing lens 20 corresponding to three factors such as different materials, different thicknesses and different pattern modes, so as to form a file to be processed.

In a switching process of the engraving mode and the cutting mode, for the base materials to be processed 260 of the first material and the second material, the laser power may be unchanged, and a position of the focusing lens 20 may be adjusted from the first coordinate height to the second coordinate height, so as to change and reduce the beam angle while the focal position is unchanged.

Further, taking the processing platform as a reference, the first coordinate height is smaller than the second coordinate height.

The parameters in the file to be processed in the engraving mode further include the engraving speed.

In this embodiment, the engraving speed in the engraving mode is not specifically limited. For example, the engraving speed in this embodiment may be different based on different materials. For the base material to be processed 260 of the first material, the cutting speed is 800 to 1200 mm/min, such as 1000 mm/min (this data is an example). For the base material to be processed 260 of second material, the cutting speed is 400 to 800 mm/min, such as 600 mm (this data is an example). For the base material to be processed 260 of the fourth material, the cutting speed is 1800 to 2200 mm/min, such as 2000 mm/min (this data is an example).

The parameters in the file to be processed in the cutting mode also include an air-assisted gas flow.

In this embodiment, the air-assisted gas flow in the engraving mode is not specifically limited. For the base material to be processed 260 of the first material, the second material and the fourth material, the air-assisted gas flow is 20 to 22 L/min, such as 21 L/min (this data is an example).

In a second optional embodiment, the upper computer 400 is configured to determine, based on the material information of the base material to be processed 260 being the target material and the thickness of the base material to be processed 260 being greater than the first thickness and less than or equal to the second thickness, that the object distance of the target zoom motion parameter corresponding to the focusing lens 20 is a third coordinate height. When the object distance of the focusing lens 20 is the third coordinate height, the distance between the focal spot height of the laser beam and the surface of the base material to be processed 260 is a first distance difference.

Optionally, the target material includes any one of a first material, a second material. In other words, when the upper computer 400 detects that the material information of the base material to be processed 260 is basswood plywood or poplar plywood, in the cutting mode, the object distance of the target zoom motion parameter corresponding to the focusing lens 20 is determined to be a third coordinate height based on the thickness of the base material to be processed 260 being greater than a first thickness and smaller than or equal to a second thickness. When the object distance of the focusing lens 20 is the third coordinate height, the distance between the focal spot height of the laser beam and the surface of the base material to be processed 260 is a first distance difference. The first distance difference is greater than or equal to 1 mm. In this embodiment, when the first distance difference is 2 mm and the thickness of the base material to be processed 260 is an intermediate thickness, the focal spot height of the laser beam sinks.

In the present disclosure, a sinking depth is determined based on the Rayleigh length of the laser after beam focusing. In a traveling direction of the beam, at a distance (generally 3 mm) from the focusing point to a cross section having an area being twice of a focal point area, energy distribution of the beam on the distance is strong. When the thickness of the processed material is greater than 3 mm, if a laser focal point is still on the surface, the laser energy where the thickness is greater than 3 mm is weak, which will lead to the inability to cut through the material as a slit depth is only 3 mm. If it is desired to cut through materials of larger than 3 mm, the focal point needs to sink at a certain distance so that the Rayleigh length of the beam covers the material thickness.

The thickness of the base material to be processed 260 is greater than the first thickness and less than or equal to the second thickness, and the thickness of the base material to be processed 260 is an intermediate thickness. When the base material to be processed 260 with an intermediate thickness is cut by using the laser beam and the laser power is 100% of total power, the upper computer 400 controls the object distance of the target zoom motion parameter corresponding to the focusing lens 20 to be the third coordinate height, so that the focal spot of the laser beam is located at a first distance difference below the surface of the base material to be processed 260, the heat affected zone of the base material to be processed 260 irradiated by the laser beam can cover the entire thickness of the base material to be processed 260. Therefore, when the thickness of the base material to be processed 260 is greater than the first thickness and smaller than or equal to the second thickness, the first distance difference at which the laser beam is irradiated below the surface of the base material to be processed 260 can increase cutting efficiency and avoid incision carbonization or reduce incision carbonization traces.

Optionally, referring to the serial numbers of lines 3 and 7 in table 2, for the first material and the second material, the second thickness is 4.5 mm. In other words, when the upper computer 400 detects that the material information of the base material to be processed 260 is basswood plywood or poplar plywood, in the cutting mode, based on the thickness of the base material to be processed 260 being 4 mm (greater than 3 mm and less than 4.5 mm), the object distance of the target zoom motion parameter corresponding to the focusing lens 20 is determined to be a third coordinate height. When the object distance of the focusing lens 20 is the third coordinate height, the focal spot height of the laser beam is at a position below the surface of the base material to be processed 260 by 2 mm, that is, when the object distance of the focusing lens 20 is the third coordinate height, the foal spot height of the laser beam is 2 mm.

The laser processing equipment 1000 according to this embodiment can form a file to be processed based on the automatically acquired parameters such as materials, thicknesses and pattern modes. Because different ignition points of different materials are considered for the file to be processed, the requirements for laser power are different. Different processing requirements of different pattern modes on different materials are considered, so the laser power and focal spot height are different. Different processing requirements of different pattern modes on different materials with different thicknesses are considered, and then a file to be processed that can be generated based on different materials, thicknesses, pattern modes and other considerations is formed. The file to be processed enables the laser processing equipment 1000 to determine a better laser power and a suitable position of the focusing lens 20 corresponding to three factors such as different materials, different thicknesses and different pattern modes, so as to form a file to be processed.

In a switching process of the engraving mode and the cutting mode, for the base material to be processed 260 of the first material or the second material, the laser power may be unchanged, and a position of the focusing lens 20 may be adjusted from a first coordinate height to a third coordinate height. Taking the thickness of the base material to be processed 260 as 4 mm as an example, the first coordinate height is 4 mm, and the third coordinate height is 2 mm, so that the focal position is lowered by 2 mm.

The parameters in the file to be processed in the engraving mode further include the engraving speed.

In this embodiment, the engraving speed in the engraving mode is not specifically limited. For example, the engraving speed in this embodiment may be different based on different materials. For the base material to be processed 260 of the first material, the cutting speed is 800 to 1200 mm/min, such as 1000 mm/min (this data is an example). For the base material to be processed 260 of second material, the cutting speed is 400 to 800 mm/min, such as 600 mm (this data is an example).

The parameters in the file to be processed in the cutting mode also include an air-assisted gas flow.

In this embodiment, the air-assisted gas flow in the engraving mode is not specifically limited. For the base materials to be processed 260 of the first material and the second material, the air-assisted gas flow is 20-22 L/min, such as 21 L/min (this data is an example).

In a third optional embodiment, the upper computer 400 is configured to determine, based on the material information of the base material to be processed 260 being the target material and the thickness of the base material to be processed 260 being greater than the second thickness and less than or equal to the third thickness, that the object distance of the target zoom motion parameter corresponding to the focusing lens 20 is a fourth coordinate height. When the object distance of the focusing lens 20 is the fourth coordinate height, the distance between the focal spot height of the laser beam and the surface of the base material to be processed 260 is a second distance difference.

Optionally, the target material includes any one of a first material, a second material. In other words, when the upper computer 400 detects that the material information of the base material to be processed 260 is basswood plywood or poplar plywood, in the cutting mode, the object distance of the target zoom motion parameter corresponding to the focusing lens 20 is determined to be a third coordinate height based on the thickness of the base material to be processed 260 being greater than a second thickness and smaller than or equal to a third thickness. When the object distance of the focusing lens 20 is the third coordinate height, the distance between the focal spot height of the laser beam and the surface of the base material to be processed 260 is a second distance difference. The second distance difference is greater than or equal to 1 mm. The second distance difference is smaller than the thickness of the base material to be processed 260. In this embodiment, the second distance difference is 2.5 mm. When the thickness of the base material to be processed 260 is a relatively large thickness, the focal spot height of the laser beam further sinks.

The thickness of the base material to be processed 260 is greater than the second thickness and less than or equal to the third thickness, and the thickness of the base material to be processed 260 is a relatively high thickness. When the base material to be processed 260 with a relatively high thickness is cut by using the laser beam and the laser power is 100% of total power, the upper computer 400 controls the object distance of the target zoom motion parameter corresponding to the focusing lens 20 to be a fourth coordinate height, so that the focal spot of the laser beam is located at a second distance difference below the surface of the base material to be processed 260, the heat affected zone of the base material to be processed 260 irradiated by the laser beam can cover the entire thickness of the base material to be processed 260. Therefore, when the thickness of the base material to be processed 260 is greater than the second thickness and smaller than or equal to the third thickness, the second distance difference at which the laser beam is irradiated below the surface of the base material to be processed 260 can increase cutting efficiency and avoid incision carbonization or reduce incision carbonization traces.

Optionally, referring to the serial numbers of lines 4 and 8 in table 2, for the first material and the second material, the third thickness is 8 mm. In other words, when the host computer 400 detects that the material information of the base material to be processed 260 is basswood plywood or poplar plywood, in the cutting mode, according to the thickness of the base material to be processed 260 being 5 mm (greater than 4.5 mm and less than 8 mm), the object distance of the target zoom motion parameter corresponding to the focusing lens 20 is determined to be a fourth coordinate height. When the object distance of the focusing lens 20 is the fourth coordinate height, the focal spot height of the laser beam is at a position below the surface of the base material to be processed 260 by 2.5 mm, that is, when the object distance of the focusing lens 20 is the fourth coordinate height, the foal spot height of the laser beam is 2.5 mm.

The laser processing equipment 1000 according to this embodiment can form a file to be processed based on the automatically acquired parameters such as materials, thicknesses and pattern modes. Because different ignition points of different materials are considered for the file to be processed, the requirements for laser power are different. Different processing requirements of different pattern modes on different materials are considered, so the laser power and focal spot height are different. Different processing requirements of different pattern modes on different materials with different thicknesses are considered, and then a file to be processed that can be generated based on different materials, thicknesses, pattern modes and other considerations is formed. The file to be processed enables the laser processing equipment 1000 to determine a better laser power and a suitable position of the focusing lens 20 corresponding to three factors such as different materials, different thicknesses and different pattern modes, so as to form a file to be processed.

In a switching process of the engraving mode and the cutting mode, for the base material to be processed 260 of the first material or the second material, the laser power may be unchanged, and a position of the focusing lens 20 may be adjusted from the first coordinate height to the fourth coordinate height. Taking the thickness of the base material to be processed 260 as 5 mm as an example, the first coordinate height is 5 mm, and the fourth coordinate height is 2.5 mm, so as to achieve a 2.5 mm of reduction in the focal position.

In a switching process of cutting modes of the base materials to be processed 260 of different thicknesses, for the base material to be processed 260 of the first material or the second material, the laser power may be unchanged, and when the base materials to be processed 260 with thicknesses greater than a first thickness and less than or equal to a second thickness are switched, the position of the focusing lens 20 may be unchanged. When the base materials to be processed 260 with thicknesses of greater than the second thickness and less than or equal to the third thickness are switched, the position of the focusing lens 20 may be unchanged.

The parameters in the file to be processed in the cutting mode also include the cutting speed.

In this embodiment, the cutting speed in the cutting mode is not specifically limited. For example, the cutting speed in this embodiment may be different based on different materials. For the base material to be processed 260 of the first material, the cutting speed is 800 to 1200 mm/min, such as 1000 mm/min (this data is an example). For the base material to be processed 260 of second material, the cutting speed is 400 to 800 mm/min, such as 600 mm (this data is an example).

The parameters in the file to be processed in the cutting mode also include an air-assisted gas flow.

In this embodiment, the air-assisted gas flow in the cutting mode is not specifically limited. For the base materials to be processed 260 of the first material and the second material, the air-assisted gas flow is 20-22 L/min, such as 21 L/min (this data is an example).

This embodiment of the present disclosure proposes balance values of the optimal focal spot and the Rayleigh length in a laser cutting scene, and the thickness of the base material to be processed 260 for cutting is concentrated at 3-8 mm. In the cutting mode, the focal position is determined to be 2 mm to 2.5 mm lower than an upper surface of the base material to be processed 260, and this position is an optimal position for the base material to be processed 260 with a thickness of 3 to 8 mm.

In an embodiment of the present disclosure, in order to realize intelligent switching between the two beam modes in engraving and cutting scenes, the operator can realize quick edition and selection in advance through the upper computer 400. The upper computer 400 sends the execution information to the lower computer 500, and the lower computer 500 controls intelligent switching between the two beam modes through instructions, thereby realizing change of the beam modes through intelligent zoom to adapt to the requirements of different scenes.

The laser processing equipment 1000 has engraving and cutting scenes when the base material to be processed 260 is processed. The engraving scene acts on the upper surface of the base material to be processed 260, and in order to ensure engraving accuracy and highest energy density, the focal position needs to be accurately located on the upper surface of the base material to be processed 260. The cutting scene has a large working distance in an Z-axis direction, so it is necessary to comprehensively consider the focal spot of the beam, the Rayleigh length and the thickness of the base material to be processed 260 to obtain the optimal spot position, so as to improve cutting efficiency and cutting effect.

When the laser processing equipment 1000 engraves the base materials to be processed 260 of different materials, the operator needs to manually set engraving parameters. However, improperly set engraving parameters may affect the engraving effect of the material and easily cause the material to be scrapped. When the engraving effect is not ideal, the operator needs to re-debug the parameters of the laser processing equipment 1000, which brings great inconvenience to the operator.

Figure 17:
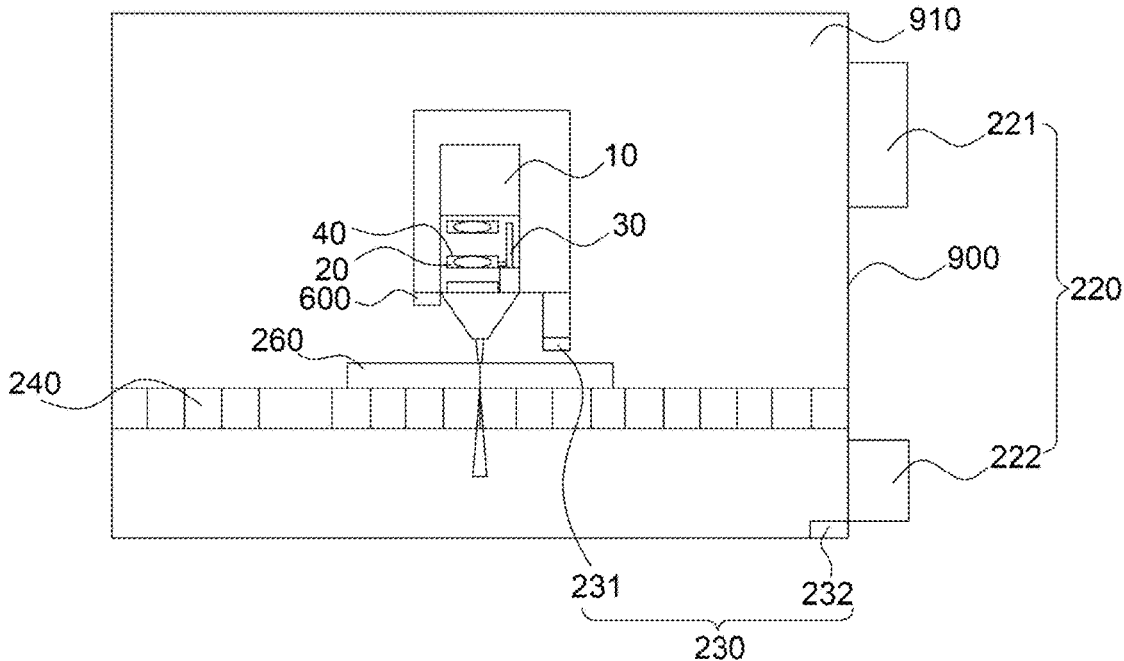
FIG. 17 is a first internal view of laser processing equipment according to an embodiment of the present disclosure.
Figure 18:
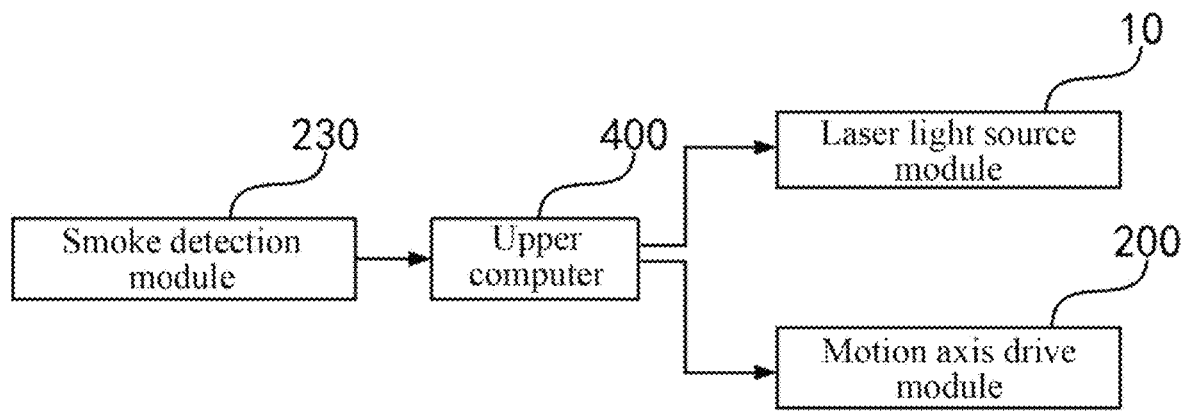
FIG. 18 is a seventh circuit block diagram of laser processing equipment according to an embodiment of the present disclosure.

Based on the above problems, referring to FIG. 17 and FIG. 18, an embodiment of the present disclosure provides laser processing equipment 1000. The laser processing equipment 1000 further includes at least one smoke exhaust assembly 220 (referring to 221 and 222 in FIG. 17) and at least one smoke detection module 230 (referring to 231 and 232 in FIG. 17). The housing 900 encloses a processing space 910 formed for laser processing. The smoke exhaust passage of the smoke exhaust assembly 220 communicates with the processing space 910. The smoke detection module 230 is located in the processing space 910. The smoke detection module 230 is configured to detect a smoke concentration value, such as a concentration of PM10, in the processing space 910. Generally, during laser processing, the smoke exhaust assembly 220 is turned on, and the smoke exhaust assembly 220 extracts smoke generated during processing. On a smoke exhaust path, the smoke detection module 230 is configured to detect the smoke concentration value in the processing space 910.

The smoke detection module 230 is electrically connected to the upper computer 400.

Figure 19:
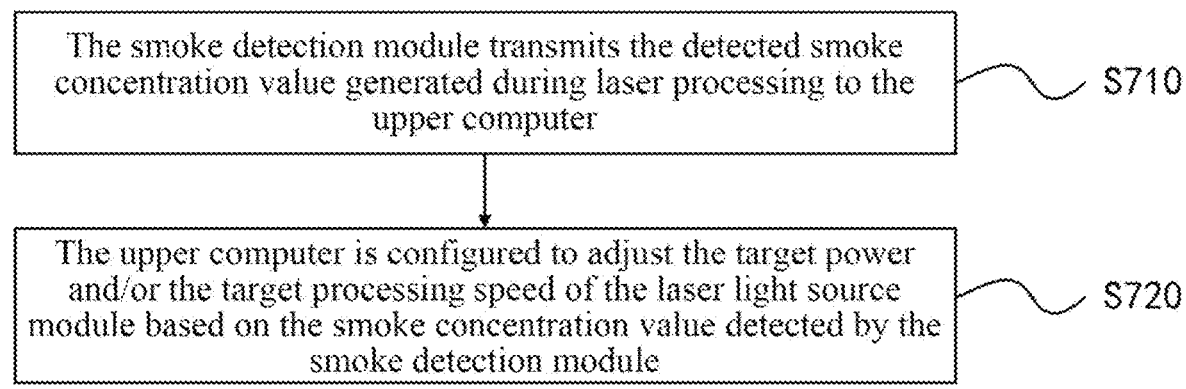
FIG. 19 is a seventh process flow diagram of laser processing equipment according to an embodiment of the present disclosure.

Referring to FIG. 18 and FIG. 19, in step S710, the smoke detection module 230 transmits the detected smoke concentration value generated during laser processing to the upper computer 400.

In step S720, the upper computer 400 is configured to adjust the target power and/or the target processing speed of the laser light source module 10 based on the smoke concentration value detected by the smoke detection module 230.

The target processing speed may be controlled by the motion axis drive module 200.

Different materials produce different smoke concentrations in the same processing mode (such as the engraving mode).

In this embodiment, the smoke detection module 230 detects the smoke concentration value of the base material to be processed 260 of the current material in real time, compares the smoke concentration value with a preset smoke concentration range, and intelligently adjusts the target power and/or the target processing speed of the laser light source module 10 in real time based on a comparison result. For example, when the detected smoke concentration value is less than the preset smoke concentration range, the target power of the laser light source module 10 is increased, or the processing speed is reduced, or the target power of the laser light source module 10 is increased and meanwhile the processing speed is reduced, so that the target power and/or the target processing speed of the laser light source module 10 can be adjusted to appropriate parameters without manual adjustment, and real-time intelligent monitoring and timely adjustment can be realized.

In a first optional embodiment, referring to FIG. 17, the at least one of smoke exhaust assembly 220 includes a first smoke exhaust module 221. The first smoke exhaust module 221 and the laser module 100 are located on the same side of the base material to be processed 260. In other words, the first smoke exhaust module 221 is arranged at a position adjacent to the top of the housing 900. For example, the first smoke exhaust module 221 is arranged at a position, adjacent to a top wall, on a side wall of the housing 900, or is arranged on a top wall. The first smoke exhaust module 221 is configured to generate an upward suction force on a processing table to extract smoke upward in the processing process.

Referring to FIG. 17, the at least one smoke detection module 230 includes a first smoke detector 231. The first smoke detector 231 is arranged between the laser module 100 and the base material to be processed 260. Further, the first smoke detector 231 is arranged adjacent to a laser beam outlet of the laser module 100 to detect a more accurate smoke concentration.

The upper computer 400 is configured to adjust the target power and/or the target processing speed of the laser light source module 10 based on the material of the base material to be processed 260 and the smoke concentration value detected by the first smoke detector 231 in the engraving mode.

Specifically, a mapping relationship table between the base materials to be processed 260 of different materials and the preset smoke concentration range is generated and stored in advance.

Referring to Table 3, Table 3 is a mapping relationship table of the base materials to be processed 260 of different materials and the preset smoke concentration ranges.

TABLE 3

| Engraving materials | PM10 concentration thresholds for optimal engraving effect (ug/m$^3$) |
|---|---|
| Basswood plywood | 45-65 |
| Walnut | 50-70 |
| Bamboo | 30-55 |
| Candlenut | 60-75 |
| Pine board | 50-75 |
| Acrylic sheet | 20-30 |
| Medium density fiberboard (MDF) | 25-45 |
| Botel Tobago cinnamon tree leaves | 5-10 |
| Sycamore leaves | 5-10 |
| Cork coasters | 20-30 |

Different base materials to be processed 260 have better engraving effects under corresponding preset smoke concentration ranges.

After engraving is started, the image collection module 600 (the camera module) determines the category (material) of the base material to be processed 260 based on the texture and color recognition of the base material to be processed 260. The zoom driving module 30 switches the position of the focusing lens 20 to be in the short-focus mode. The first smoke detector 231 located at the laser outlet detects the PM10 concentration in the smoke generated by laser burning of the base material to be processed 260 in the working space in real time, and dynamically adjusts the engraving speed and the laser power in real time based on the smoke concentration.

The slower the engraving speed, more deeply the laser burns, more smoke is generated, and the larger the PM10 concentration is. The greater the engraving power, more deeply the laser burns, more smoke is generated, and the larger the PM10 concentration is. The laser processing equipment 1000 can adjust the engraving parameters in real time based on the material of the base material to be processed 260 acquired by the image collection module 600 (the camera module) and the PM10 concentration value corresponding to the optimal engraving parameter of the base material to be processed 260.

For example, taking basswood plywood as an example, when the first smoke detector 231 detects that the PM10 concentration in the smoke is 30 ug/m$^3$ (less than 45 ug/m$^3$), it indicates that the engraving speed at this time is too fast or the laser power is insufficient. The first smoke detector 231 feeds back the detected PM10 concentration in the smoke to the upper computer 400. The upper computer 400 compares the detected PM10 concentration in the smoke with 45 ug/m$^3$, and obtains that the current PM10 concentration in the smoke is less than the preset smoke concentration range, thereby controlling to increase the laser power and/or decrease the engraving speed until the PM10 concentration in the smoke detected by the first smoke detector 231 is within the preset smoke concentration range.

Figure 20:
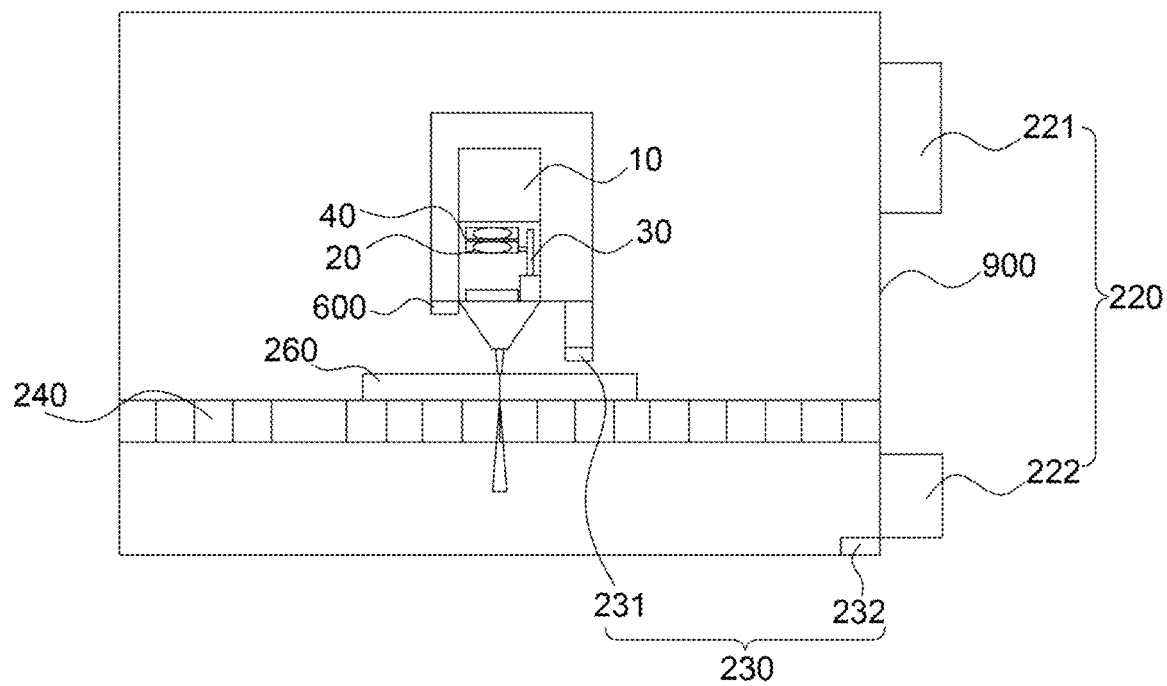
FIG. 20 is a second internal view of laser processing equipment according to an embodiment of the present disclosure.

In a second optional embodiment, referring to FIG. 20, the at least one smoke exhaust assembly 220 includes a second smoke exhaust module 222. The second smoke exhaust module 222 is located on one side of the base material to be processed 260 away from the laser module 100. Optionally, the second smoke exhaust module 222 is arranged on the lower side of the engraved honeycomb panel 240. The second smoke exhaust module 222 is configured to generate a downward suction force for a processing space 910 to extract smoke in the processing process downward.

The at least one smoke detection module 230 includes a second smoke detector 232.

The second smoke detector 232 is arranged on one side of the base material to be processed 260 away from the laser module 100. Optionally, the second smoke detector 232 may be arranged at an air extraction port of the second smoke exhaust module 222.

The upper computer 400 is configured to adjust the target power and/or the target processing speed of the laser light source module 10 based on the smoke concentration value detected by the second smoke detector 232 being less than the preset smoke concentration range in the cutting mode.

In other words, after cutting is started, the zoom driving module 30 changes the position of the focusing lens 20 to be in the long-focus mode. The second smoke detector 232 located at the bottom of the engraved honeycomb panel 240 detects the PM10 concentration (smoke concentration value) at the bottom of the engraved honeycomb panel 240 in real time, and adjusts cutting speed and power based on the PM10 concentration threshold. The present disclosure does not limit the PM10 concentration threshold. Optionally, the PM10 concentration threshold range is 50-80 ug/m$^3$. At this time, the base material to be processed 260 has a relatively good cutting effect.

Generally, the deeper the depth of laser burning processing material, the larger the PM10 concentration in the smoke, and cutting depth information can be obtained by converting the PM10 concentration, so cutting parameters can be identified and adjusted by detecting the PM10 concentration. If the base material to be processed 260 is not cut completely, the smoke will run upward, and an upper high-power exhaust fan will pump the smoke away in time, so as to prevent the smoke generated by the base material to be processed 260 that is not cut completely from running under the engraved honeycomb panel 240 to affect recognition accuracy. If the PM10 concentration detected by the second smoke detector 232 at the bottom of the engraved honeycomb panel 240 does not reach a preset value (50-80 ug/m$^3$), the laser processing equipment 1000 automatically adjusts the cutting parameters (for example, increasing the cutting power and/or decreasing the cutting speed), so that the PM10 concentration at the bottom of the engraved honeycomb panel 240 is increased.

In a third optional embodiment, referring to FIG. 17 and FIG. 20, this embodiment is a combination of the first optional embodiment and the second optional embodiment, the at least one smoke exhaust assembly 220 includes a first smoke exhaust module 221 and a second smoke exhaust module 222. The first smoke exhaust module 221 and the laser module 100 are located on the same side of the base material to be processed 260. The second smoke exhaust module 222 is located on one side of the base material to be processed 260 away from the laser module 100. The at least one smoke detection module 230 includes a first smoke detector 231 and a second smoke detector 232. The first smoke detector 231 is arranged between the laser module 100 and the base material to be processed 260. The second smoke detector 232 is arranged on one side of the base material to be processed 260 away from the laser module 100.

The specific implementation process of this embodiment includes intelligent real-time adjustment based on the laser parameter of the smoke detection module 230 in the engraving mode in the first optional embodiment, and further includes intelligent real-time adjustment based on the laser parameter of the smoke detection module 230 in the cutting mode in the first optional embodiment.

In general techniques, when materials of different materials and thicknesses are cut by laser, the operator needs to manually set cutting parameters and adjust the position of the laser spot. If the cutting parameters and the spot position are not properly set, the processing effect will be affected and the base material to be processed 260 will be scrapped easily. For example, if the operator wants to cut a complex pattern on a 5 mm thick wooden board, a cutting parameter is randomly set. After a machine runs, in fact, the cutting parameters set by the operator can only enable the laser to cut 2 mm of the wooden board, and the remaining 3 mm of the wooden board is not cut, so the operator directly takes out a workpiece without clear conditions. At this time, it is very difficult to make secondary cutting along original cutting marks, and it is difficult for a secondary cutting track to coincide with a primary cutting track.

Figure 21:
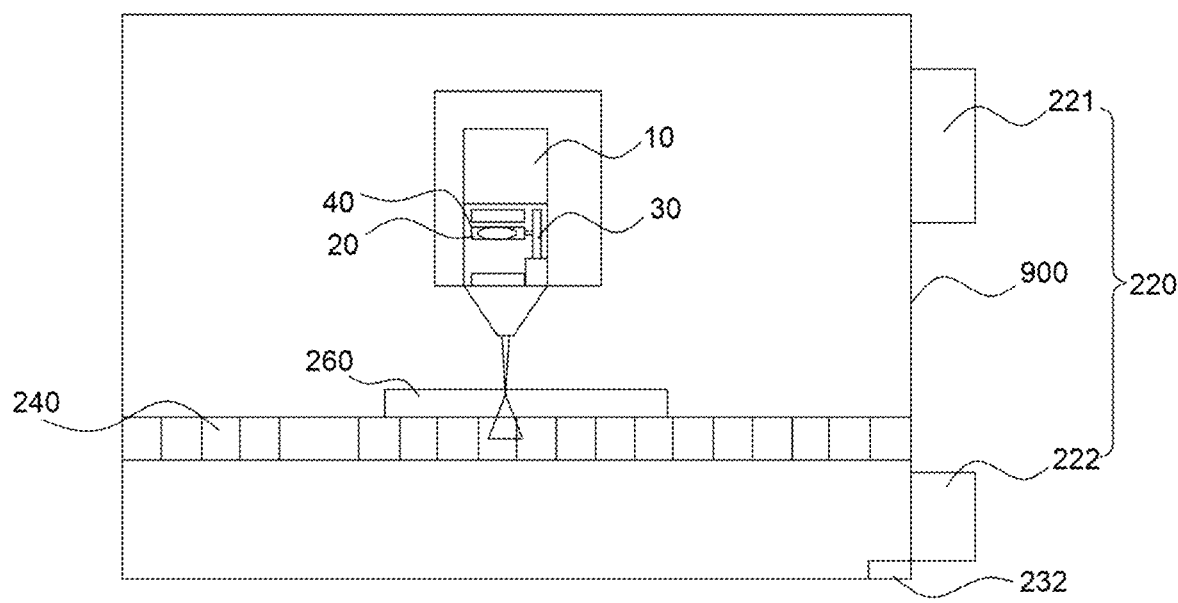
FIG. 21 is a third internal view of laser processing equipment according to an embodiment of the present disclosure.
Figure 22:
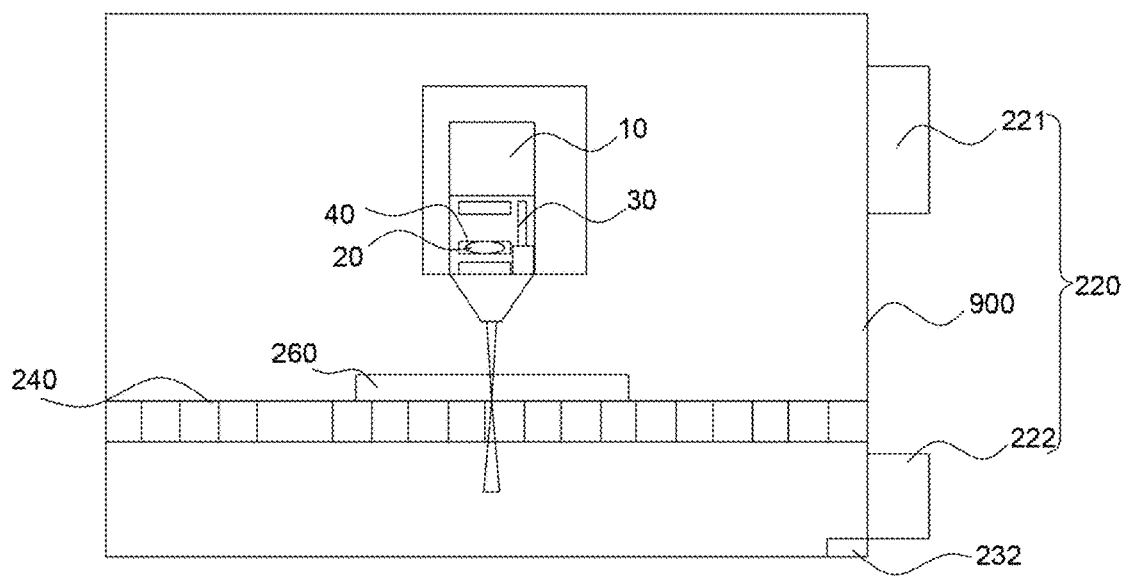
FIG. 22 is a fourth internal view of laser processing equipment according to an embodiment of the present disclosure.

Based on the foregoing problem, referring to FIG. 21 and FIG. 22, in the laser processing equipment 1000 according to the present disclosure, at least one smoke exhaust module 220 is located on one side of the base material to be processed 260 away from the laser module 100, such as the second smoke exhaust module 222 in the foregoing embodiment.

The smoke detection module 230 is arranged on one side of the base material to be processed 260 away from the laser module 100, such as the foregoing second smoke detector 232.

The upper computer 400 is configured to control the zoom driving module 30 to drive the focusing lens 20 to move towards a long-focus mode from a short-focus mode in the cutting mode, and determine the zoom motion parameter of the zoom driving module 30 based on whether the smoke concentration value detected by the smoke detection module 230 is greater than or equal to a preset smoke concentration range.

The present disclosure does not specifically limit the preset smoke concentration range. Optionally, the preset smoke concentration range includes, but is not limited to, 50-80 ug/m$^3$. The cutting effect corresponding to the preset smoke concentration range is better.

After cutting is started, the laser light source module 10 starts to work at full power and maximum engraving speed, and the zoom driving module 30 drives the focusing lens 20 to move from the short-focus mode to the long-focus mode until the smoke concentration detected by the smoke detection module 230 at the bottom of the base material to be processed 260 reaches a set threshold (50-80 ug/m$^3$). The zoom driving module 30 stops driving the focusing lens 20 to move, which indicates that the spot position at this time is relatively good and the cutting effect is good.

In this embodiment, when the zoom driving module 30 drives the focusing lens 20 to move from the short-focus mode to the short-focus mode, the movement of the focusing lens changes the Rayleigh length of the laser beam, and the laser beam has a larger energy density within the Rayleigh length. In the short-focus mode, the focusing lens 20 is relatively distant from the laser outlet. In the long-focus mode, the focusing lens 20 is relatively close to the laser outlet. In the long-focus mode, the laser beam is narrower and the energy density is higher.

When the thickness of the base material to be processed 260 is within the Rayleigh length range, the problem of inaccurate setting of the sinking depth of the spot position by the operator can be effectively avoided. In this embodiment, there is no need for the operator to manually determine the spot position, and there is no need to test the preferred spot position many times, thereby avoiding damage to the base material to be processed 260, and intelligently adjusting the laser parameters in real time based on the smoke concentration fed back by the smoke detection module 230 in the cutting mode.

The present disclosure does not limit a specific structure of the zoom driving module 30.

Figure 23:
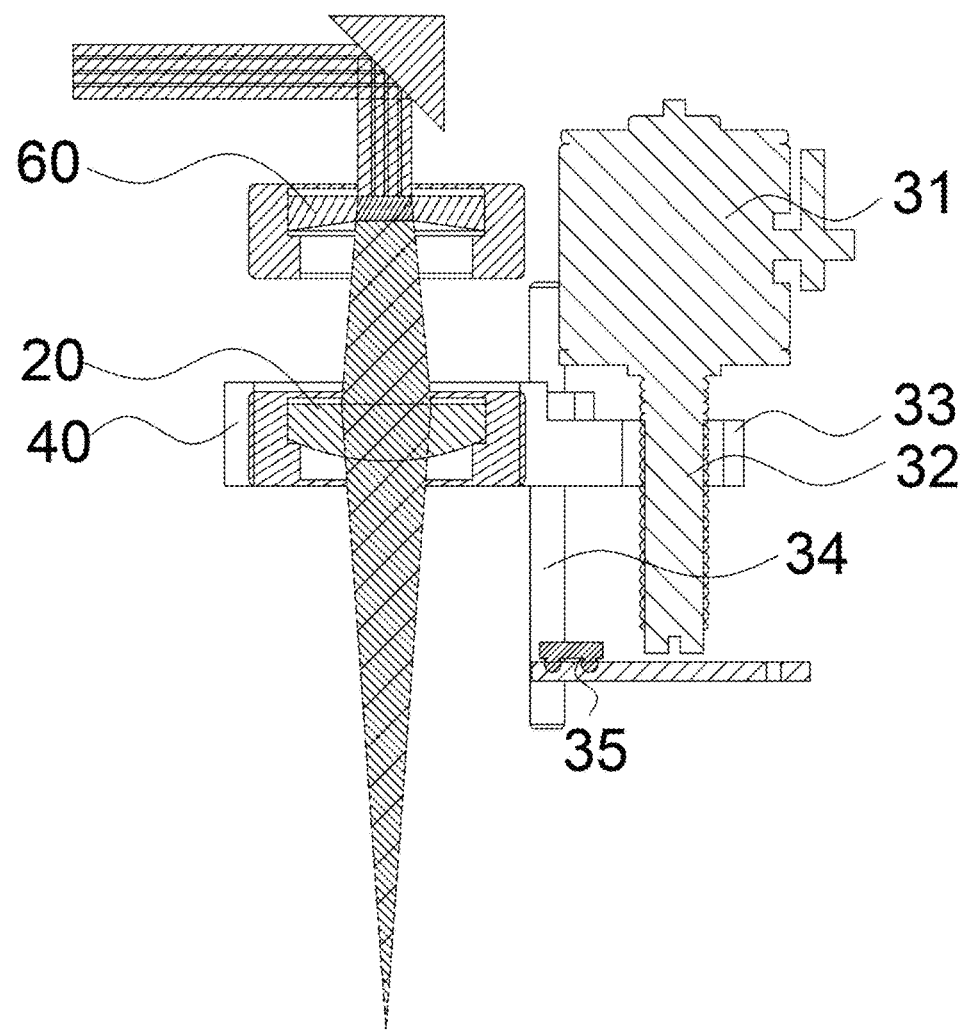
FIG. 23 is a schematic cross section of a laser module when a focusing lens is located at one position according to an embodiment of the present disclosure.
Figure 24:
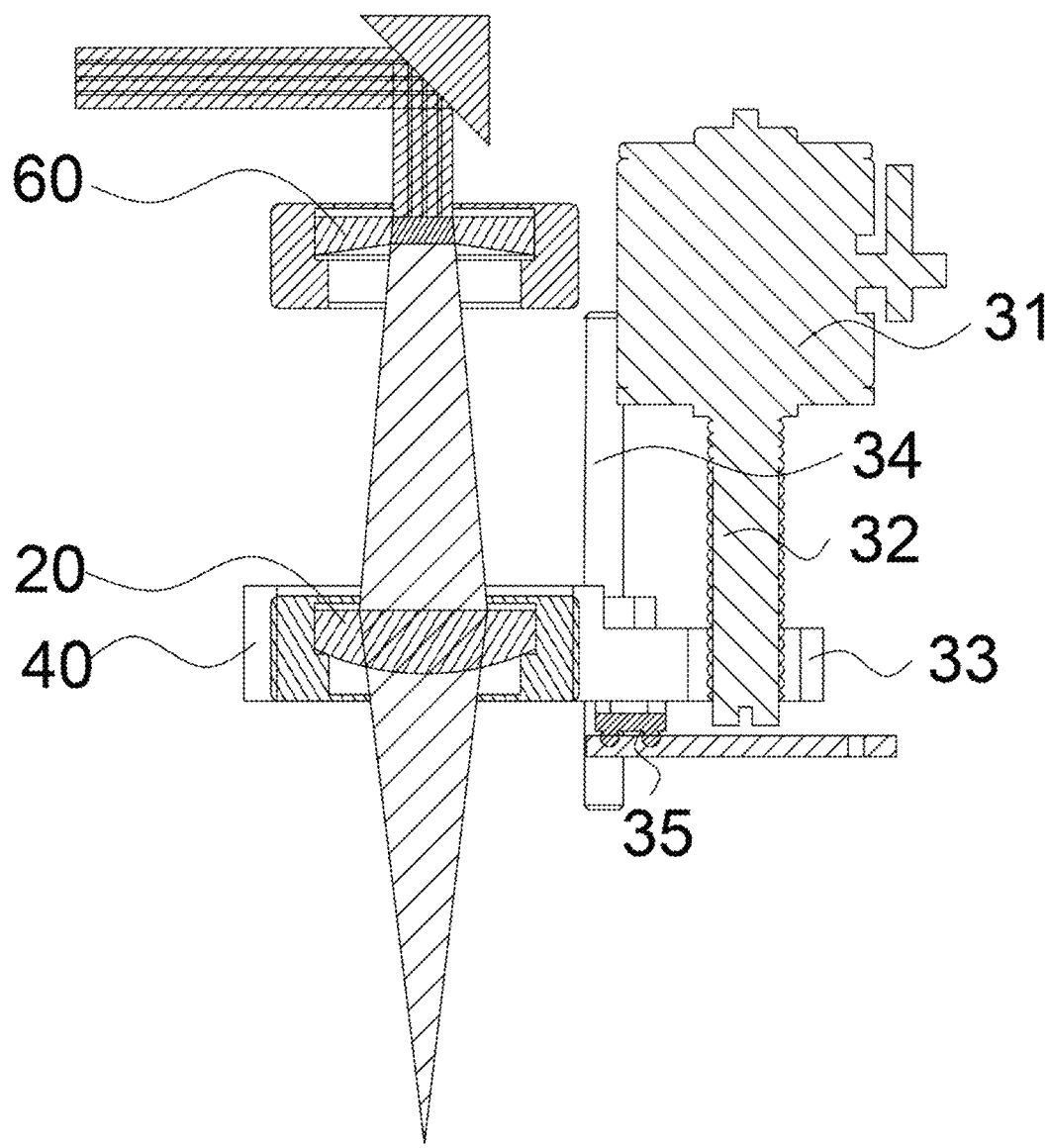
FIG. 24 is a schematic cross section of a laser module when a focusing lens is located at another position according to an embodiment of the present disclosure.

Optionally, as shown in FIG. 23 to FIG. 24, the zoom driving module 30 includes a drive motor 31, a transmission rod 32, and a connecting nut 33. An output shaft of the drive motor 31 is connected to one end of the transmission rod 32. The transmission rod 32 is a screw. The connecting nut 33 is in threaded connection with an outer periphery of the transmission rod 32. The focusing lens 20 is located beside the transmission rod 32. The focusing lens 20 is connected to the transmission rod 32 through the connecting nut 33. Further, the lens holder 40 of the focusing lens 20 is connected to the transmission rod 32 through the connecting nut 33. An extension direction of the transmission rod 32 is parallel to an optical axis direction of the focusing lens 20.

Specifically, the drive motor 31 drives the transmission rod 32 to rotate, then drives the connecting nut 33 to move along the optical axis direction of the focusing lens 20, specifically move upward or downward, and then drives the focusing lens 20 to move along the optical axis direction. When the focusing lens 20 is moved in the optical axis direction, an optical imaging system is changed, and then the position of the focal spot is changed or the position of the focal spot is not changed but the beam angle is changed, so as to switch to the short-focus mode or the long-focus mode.

Referring to FIG. 23 to FIG. 24, the zoom driving module 30 includes a guide rod 34. The focusing lens 20 is installed on the lens holder 40. The lens holder 40 slides along the guide rod 34. The guide rod 34 is parallel to an optical axis of the focusing lens 20. The guide rod 34 is configured to provide guiding for the focusing lens 20 to move along the optical axis direction, and then a center of the focusing lens 20 keeps aligned with a center of the laser beam, thereby ensuring that linear motion is more accurate and avoiding errors caused by the linear motion.

In an optional embodiment, the connecting nut 33 may be fixedly connected to the lens holder 40 by means of screws.

Referring to FIG. 23 to FIG. 24, the zoom driving module 30 includes at least one position sensor 35. The at least one position sensors 35 is configured to generate a feedback signal when the focusing lens 20 is in an initial position. The position sensor 35 abuts against the lens holder 40 at the initial position. After each processing, the lens holder 40 returns to the initial position. The lens holder 40 starts to move from the initial position at the beginning of each processing, so as to ensure accuracy of each movement and reduce repetitive movement errors.

The drive motor 31 includes, but is not limited to, a stepper motor. The stepper motor can achieve micron-level positioning accuracy through precise pulse signal control. The transmission rod 32 includes, but is not limited to, a screw rod. The screw rod is integrated in the stepper motor to form a screw rod stepper motor. By integrating the screw directly into the stepper motor, reduction of additional transmission components improves transmission efficiency, thereby simplifying mechanical design and reducing transmission errors. In addition, a transmission mode of the screw rod and the stepper motor is simple in structure, convenient for production and easy for later maintenance, and the screw rod and the connecting nut 33 have high wear resistance and long service life. In addition, the screw rod stepper motor also has self-locking capability. When a control pulse stops inputting, the stepper motor can be kept at a fixed position to realize positioning when the focusing lens 20 stops moving, and has high positioning accuracy, so that the focusing lens 20 is accurately located at the target position, and then the focal spot is located at a desired height.

FIG. 23 to FIG. 24 are embodiments in which the position of the focusing lens 20 is changed so as to change the beam angle and keep the position of the laser spot unchanged. In other embodiments, the position of the focusing lens 20 is changed to adjust the position of the laser spot and the beam Rayleigh length.

In another embodiment, the zoom driving module 30 includes a linear motor and a magnetic spring. The electromagnetic spring includes a magnetic shaft and a shaft sleeve, where the shaft sleeve is connected with a rotor of the linear motor, and the magnetic shaft is connected with a base of the linear motor. The magnetic shaft can magnetically absorb the shaft sleeve. The shaft sleeve slidably sleeves the magnetic shaft. A groove is formed in the shaft sleeve along the axial direction. The shaft sleeve may rotate around the magnetic shaft to adjust relative positions between the groove and the magnetic shaft. By forming a groove in the shaft sleeve of the electromagnetic spring, a volume of the shaft sleeve at the groove will be inconsistent with the rest of the shaft sleeve. By adjusting the relative positions between the groove and the magnetic shaft, a magnetic attraction force of the magnetic shaft to the shaft sleeve at the groove can be changed, and then the magnetic attraction force of the magnetic shaft to the whole shaft sleeve is consistent with a force required in actual application scenarios of the electromagnetic spring. A constant thrust or pulling force is provided in an entire stroke range of the linear motor to drive the focusing lens 20 to move stably and reduce problems such as jitter caused by an acceleration change during the movement of the focusing lens 20.

Then, optionally, referring to FIG. 23 to FIG. 24, the laser module 100 includes a concave lens 60. The concave lens 60 is arranged on an optical path of the laser light source module 10 and the focusing lens 20. The concave lens 60 is configured to expand the laser beam.

An incident beam emitted by the laser light source module 10 is reflected by the reflector prism and then enters the concave lens 60 to expand the beam. The expanded beam of the concave lens 60 is emitted in the focusing lens 20. The zoom driving module 30 (for example, the screw rod stepper motor) moves the focusing lens 20 to obtain a size of the focal spot at the focal point position.

Optionally, a zoom portion is configured to use the concave lens 60 to expand the beam and use the convex lens to focus the beam. A focal size, an included angle of the beam and the focal depth are changed before and after zooming, so that the focal point position can be kept unchanged, and the engraving mode and the cutting mode can be switched when the position of the focal spot is unchanged. In other embodiments, the zoom portion is configured to use the concave lens 60 to expand the beam and use the convex lens to focus the beam, and the focal size, the included angle of the beam, the focal depth, and the focal position are changed before and after zooming.

Figure 25:
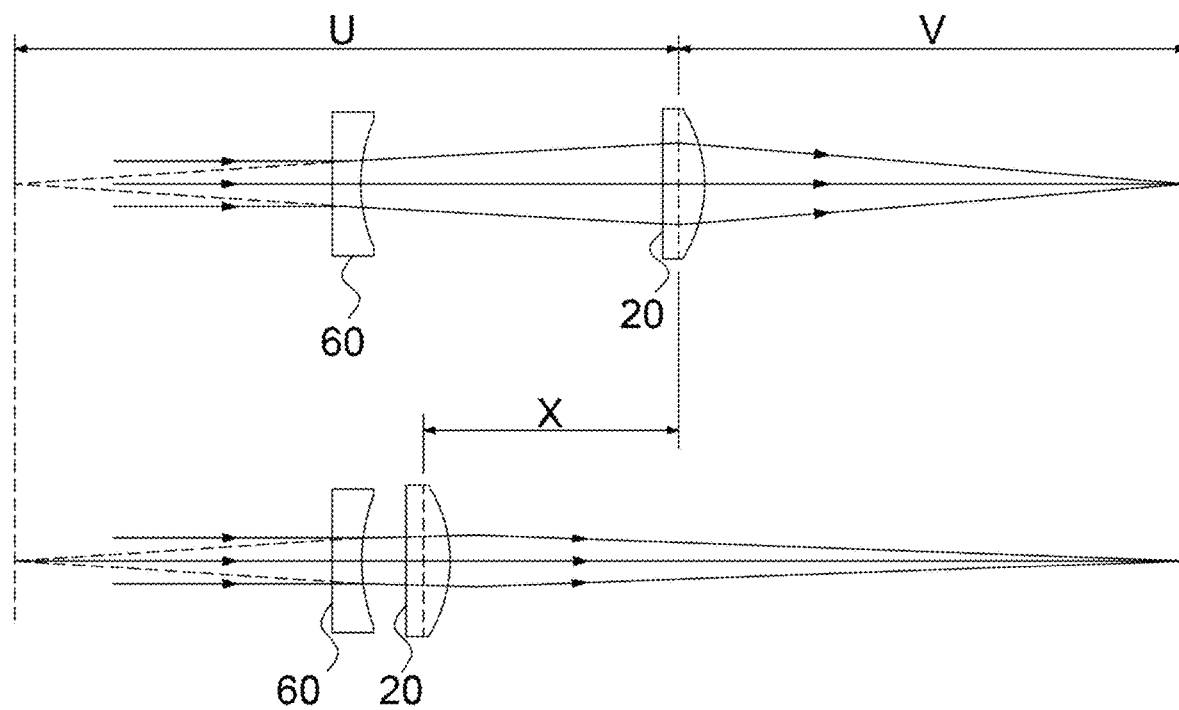
FIG. 25 is a light path diagram when a focusing lens is located at a different position compared with a concave lens according to an embodiment of the present disclosure.

Referring to FIG. 25, FIG. 25 is a light path diagram when a focusing lens 20 is located at different positions relative to a concave lens 60 according to an embodiment of the present disclosure.

For example, the position of the focal spot is unchanged the object distance of an optical system in the short-focus mode is assumed to be U, the image distance is V, the focal length of the convex lens is f, and the stroke of the convex lens is X when the focal length is switched, in order to keep the position of the image point before and after zooming unchanged, there are Gaussian object image distance formula:

$$\frac{1}{U} + \frac{1}{V} = \frac{1}{f} \quad (1)$$

$$\frac{1}{U-X} + \frac{1}{V+X} = \frac{1}{f} \quad (2)$$

From formula (1) and formula (2), the following formula is obtained:

$$f = \frac{V(V+X)}{2V+X} \quad (3)$$

After the focal length f of the convex lens is preliminarily calculated based on formula (3), the corresponding radius of curvature of the concave lens 60 can be calculated based on the structure, an initial optical model can be determined, and then further optimization is performed by computer software.

Pattern engraving (a first layer)-air assistance (a weak air mode)-short focus (the focal position is on the surface of the base material to be processed 260 in the engraving mode).

Pattern outer contour cutting (a second layer)-air assistance (strong air mode)-long focus (the focal position is on the surface of the base material to be processed 260 in the cutting mode)-Z-axis lifting controlling the focal point to sink ½ of the thickness (2 mm) of the base material to be processed 260.

Instruction executions are executed based on the layers. After the first layer is executed, the second layer is executed. When each layer is executed, it is necessary to assist the control in advance to edit the beam mode and the thickness of the base material to be processed 260. After the editing is completed, information is sent to the lower computer 500, and the lower computer 500 sends an instruction to a laser head control board. After the laser head control board receives an instruction, the drive motor 31 drives the focusing lens to move, and then realizes zoom.

The laser processing equipment 1000 according to the present disclosure includes, but is not limited to, the following control method steps. For scenes that engraving and cutting are needed at the same time, for example, high-resolution pictures are engraved on 5 mm plywood, and then patterns are cut based on outer contours. The zoom drive motor 30 includes, but is not limited to, a screw rod stepper motor.

Hereinafter, a workflow of the laser processing equipment 1000 will be described as an example.

In a first step, the upper computer 400 identifies the material of the base material to be processed 260 and acquires the thickness of the base material to be processed 260 and the processing pattern modes. Parameters when the base material to be processed 260 is engraved are set to generate a file to be processed. The parameters of the file to be processed include a power percentage of an engraving light source, speed, a distance of the focal point from a surface of the base material to be processed 260 (above the base material to be processed 260 is positive, and in the base material to be processed 260 is negative), an air pressure and an air volume, and the contents of engraving work are set at the same time.

In a second step, the upper computer 400 starts with a start command, transmits the above parameters to the lower computer 500 which receives the work instruction of the upper computer 400, and controls the laser module 100, the motion axis drive module 200, the stepper motor of the zoom driving module 30, and the like. Based on the corresponding instructions, the laser is turned on and worked with a fixed current, the X-axis, Y-axis and Z-axis motion axis motors are driven to run, and the stepper motor is driven to control the screw rod to drive the focusing lens 20 to move until the focal spot is located on the surface of the base material to be processed 260, that is, a height of the focal spot from the processing platform is 5 mm.

In a third step, at the end of the engraving mode, it is ready to switch to the cutting mode. When it is necessary to re-adjust the position of the focal spot, the lower computer 500 can control the laser module 100 to stop outputting laser light. During this period, based on the thickness of the base material to be processed 260, the z-axis drive module can be controlled to adjust the height of the laser module 100 so that the focus is at a suitable position, such as, at a position below the surface of the base material to be processed 260 by 2.5 mm. The screw rod is controlled by the screw rod stepper motor to start running until the focusing lens 20 reaches the target position. After the system is switched to the cutting mode, the z-axis drive module gives the lower computer 500 one feedback that switching is finished. After receiving all feedbacks, the lower computer 500 starts to output laser based on the instructions, and starts cutting after the air pressure and the air flow are controlled to corresponding values.

In a fourth step, the engraving and cutting may be flexibly and automatically switched at any time based on the above steps. After the engraving or cutting is completed, the laser module 100 is turned off, and the system returns to a default state. The default state can be an engraving or a cutting state. An air nozzle airflow continues to work for several minutes and then stops working, and a laser fan continues to work for several minutes and then stops working. The system is in a waiting state, waiting for the next operation.

Although the embodiments of the disclosure have already been illustrated and described, it is understood that the embodiments are exemplary but cannot be understood as limitation of the disclosure, and the embodiments can be changed, amended, replaced and converted by those skilled in the art in the scope of the disclosure. These improvements and modifications shall fall within the protection scope of the present disclosure.

What is claimed is:

1. Laser processing equipment, comprising:
    a laser module, wherein the laser module comprises a laser light source module, a focusing lens and a zoom driving module, the laser light source module is configured to emit a laser beam, the focusing lens is located on a light path of the laser beam, the zoom driving module is connected to the focusing lens, the zoom driving module is configured to drive the focusing lens to move to change a focal spot position and/or a beam angle of the laser beam;
    a motion axis drive module, wherein the motion axis drive module is connected to the laser module, and the motion axis drive module is configured to drive the laser module to move;

a thickness detection module, wherein the thickness detection module is configured to collect thickness information of a base material to be processed;

an upper computer, wherein the upper computer is configured to acquire material information of the base material to be processed and receive the thickness information of the base material to be processed collected from the thickness detection module, and generate a file to be processed based on the material information, the thickness information and a pattern mode to be processed, the file to be processed comprises target power of the laser light source module, a target zoom motion parameter of the zoom driving module, and a target motion axis parameter of the motion axis drive module; and a lower computer, wherein the lower computer is configured to receive the file to be processed from the upper computer, control power of the laser light source module as the target power, control a zoom motion parameter of the zoom driving module as the target zoom motion parameter, and control a motion axis parameter of the motion axis drive module as the target motion axis parameter according to the file to be processed;

the laser processing equipment further comprises an image collection module, the image collection module is configured to collect an image of the base material to be processed; the upper computer is further configured to receive the image of the base material to be processed, and determine the material information of the base material to be processed based on a matching degree between the image of the base material to be processed and a reference image being greater than or equal to a preset matching degree threshold; and/or the laser processing equipment further comprises a material identification module, the material identification module is configured to determine material information of the base material to be processed based on at least one of intensity, a reflection angle and spectral information of a reflected signal of the base material to be processed;

wherein the laser processing equipment further comprises a housing, at least one smoke exhaust assembly and at least one smoke detection module: the housing encloses and forms a processing space for laser processing, a smoke exhaust channel of the at least one smoke exhaust assembly communicates with the processing space, the at least one smoke detection module is located in the processing space, the at least one smoke detection module is configured for detecting a smoke concentration value in the processing space, the at least one smoke detection module is electrically connected to the upper computer, and the upper computer is configured to adjust the target power of the laser light source module and/or a target processing speed based on the smoke concentration value detected by the at least one smoke detection module;

wherein the at least one exhaust assembly comprises a first smoke exhaust module, the first smoke exhaust module and the laser module are located on a same side of the base material to be processed, the at least one smoke detection module comprises a first smoke detector, the first smoke detector is arranged between the laser module and the base material to be processed, and the upper computer is configured to adjust the target power and/or the target processing speed of the laser light source module based on a material of the base material to be processed and the smoke concentration value detected by the first smoke detector in an engraving mode; and the at least one smoke exhaust assembly comprises a second smoke exhaust module, the second smoke exhaust module is located on one side, away from the laser module, of the base material to be processed, the at least one smoke detection module comprises a second smoke detector, the second smoke detector is arranged on one side, away from the laser module, of the base material to be processed, and the upper computer is configured to adjust the target power and/or the target processing speed of the laser light source module based on the smoke concentration value detected by the second smoke detector being smaller than a preset smoke concentration range in a cutting mode.

2. The laser processing equipment according to claim 1, wherein the upper computer further comprises an editable display module, the editable display module is configured to cover a processing area of an edit page of the editable display module with the image of the base material to be processed as a cover layer and cover the image of the base material to be processed with a pattern to be processed, and the upper computer generates the file to be processed based on the image of the base material to be processed, the material information, the thickness information and the pattern mode to be processed.

3. The laser processing equipment according to claim 1, wherein the thickness detection module comprises a position probe, the motion axis drive module comprises a lifting drive module, the lifting drive module is connected to the position probe, the lifting drive module is configured to drive the position probe to descend to a surface of the base material to be processed, the position probe is configured to detect a first height coordinate after descending to the surface of the base material to be processed, and the upper computer is configured to determine the thickness information of the base material to be processed based on the first height coordinate and a preset reference height coordinate.

4. The laser processing equipment according to claim 1, wherein when the pattern mode to be processed includes an engraving mode, the upper computer is configured to determine, based on the thickness information of the base material to be processed, that an object distance of the target zoom motion parameter corresponding to the focusing lens is a first coordinate height, and that a focal spot height of the laser beam is a thickness of the base material to be processed when the object distance of the focusing lens is the first coordinate height;

the upper computer is further configured to determine that the target power is first power when the material information of the base material to be processed is a first material, the target power is second power when the material information of the base material to be processed is a second material, the target power is third power when the material information of the base material to be processed is a third material, the target power is fourth power when the material information of the base material to be processed is a fourth material, and the first power, the second power, the third power and the fourth power are gradually decreased.

5. The laser processing equipment according to claim 1, wherein the upper computer is configured to determine that the target power is greater than or equal to preset power, when the pattern mode to be processed comprises a cutting mode;

the upper computer is configured to, based on the material information of the base material to be processed being a target material and a thickness of the base material to be processed being less than or equal to a first thickness, determine that an object distance of the target zoom motion parameter corresponding to the focusing lens is a second coordinate height, and a focal spot height of the laser beam is the thickness of the base material to be processed when the object distance of the focusing lens is the second coordinate height; or, the upper computer is configured to, based on the material information of the base material to be processed being a target material and a thickness of the base material to be processed being greater than a first thickness or less than or equal to a second thickness, determine that an object distance of the target zoom motion parameter corresponding to the focusing lens is a third coordinate height, and a distance between a focal spot height of the laser beam and a surface of the base material to be processed is a first distance difference when the object distance of the focusing lens is the third coordinate height; or, the upper computer is configured to, based on the material information of the base material to be processed being a target material and a thickness of the base material to be processed being a second thickness and less than or equal to a third thickness, determine that an object distance of the target zoom motion parameter corresponding to the focusing lens is a fourth coordinate height, and a distance between a focal spot height of the laser beam and a surface of the base material to be processed is a second distance difference when the object distance of the focusing lens is the fourth coordinate height.

6. The laser processing equipment according to claim 1, wherein the lower computer is configured to form a pre-processing trace on the base material to be processed based on the target power in the file to be processed and the target zoom motion parameter;

the laser processing equipment further comprises a camera module, wherein the camera module is configured to acquire an image of the pre-processing trace; the upper computer is configured to receive the image of the pre-processing trace from the camera module, acquire a parameter of the pre-processing trace based on the image of the pre-processing trace, and when the parameter of the pre-processing trace is outside a preset parameter range, calibrate the target power in the file to be processed and/or the target zoom motion parameter.

7. The laser processing equipment according to claim 1, wherein the at least one smoke exhaust assembly is located on one side, away from the laser module, of the base material to be processed, the at least one smoke detection module is arranged on one side, away from the laser module, of the base material to be processed, the upper computer is configured to control the zoom driving module to drive the focusing lens to move into a long-focus mode from a short-focus mode in a cutting mode, and determine the zoom motion parameter of the zoom driving module based on whether the smoke concentration value detected by the at least one smoke detection module is greater than or equal to a preset smoke concentration range.

8. The laser processing equipment according to claim 2, wherein the lower computer is configured to form a pre-processing trace on the base material to be processed based on the target power in the file to be processed and the target zoom motion parameter;

the laser processing equipment further comprises a camera module, wherein the camera module is configured to acquire an image of the pre-processing trace; the upper computer is configured to receive the image of the pre-processing trace from the camera module, acquire a parameter of the pre-processing trace based on the image of the pre-processing trace, and when the parameter of the pre-processing trace is outside a preset parameter range, calibrate the target power in the file to be processed and/or the target zoom motion parameter.

9. The laser processing equipment according to claim 3, wherein the lower computer is configured to form a pre-processing trace on the base material to be processed based on the target power in the file to be processed and the target zoom motion parameter;

the laser processing equipment further comprises a camera module, wherein the camera module is configured to acquire an image of the pre-processing trace; the upper computer is configured to receive the image of the pre-processing trace from the camera module, acquire a parameter of the pre-processing trace based on the image of the pre-processing trace, and when the parameter of the pre-processing trace is outside a preset parameter range, calibrate the target power in the file to be processed and/or the target zoom motion parameter.

10. The laser processing equipment according to claim 4, wherein the lower computer is configured to form a pre-processing trace on the base material to be processed based on the target power in the file to be processed and the target zoom motion parameter;

the laser processing equipment further comprises a camera module, wherein the camera module is configured to acquire an image of the pre-processing trace; the upper computer is configured to receive the image of the pre-processing trace from the camera module, acquire a parameter of the pre-processing trace based on the image of the pre-processing trace, and when the parameter of the pre-processing trace is outside a preset parameter range, calibrate the target power in the file to be processed and/or the target zoom motion parameter.

11. The laser processing equipment according to claim 5, wherein the lower computer is configured to form a pre-processing trace on the base material to be processed based on the target power in the file to be processed and the target zoom motion parameter;

the laser processing equipment further comprises a camera module, wherein the camera module is configured to acquire an image of the pre-processing trace; the upper computer is configured to receive the image of the pre-processing trace from the camera module, acquire a parameter of the pre-processing trace based on the image of the pre-processing trace, and when the parameter of the pre-processing trace is outside a preset parameter range, calibrate the target power in the file to be processed and/or the target zoom motion parameter.

12. The laser processing equipment according to claim 2, wherein the laser processing equipment further comprises a housing, at least one smoke exhaust assembly and at least one smoke detection module; the housing encloses and forms a processing space for laser processing, a smoke exhaust channel of the at least one smoke exhaust assembly communicates with the processing space, the at least one smoke detection module is located in the processing space, the at least one smoke detection module is configured for detecting a smoke concentration value in the processing space, the at least one smoke detection module is electrically connected to the upper computer, and the upper computer is configured to adjust the target power of the laser light source module and/or a target processing speed based on the smoke concentration value detected by the at least one smoke detection module.

13. The laser processing equipment according to claim 3, wherein the laser processing equipment further comprises a housing, at least one smoke exhaust assembly and at least one smoke detection module; the housing encloses and forms a processing space for laser processing, a smoke exhaust channel of the at least one smoke exhaust assembly communicates with the processing space, the at least one smoke detection module is located in the processing space, the at least one smoke detection module is configured for detecting a smoke concentration value in the processing space, the at least one smoke detection module is electrically connected to the upper computer, and the upper computer is configured to adjust the target power of the laser light source module and/or a target processing speed based on the smoke concentration value detected by the at least one smoke detection module.

14. The laser processing equipment according to claim 4, wherein the laser processing equipment further comprises a housing, at least one smoke exhaust assembly and at least one smoke detection module; the housing encloses and forms a processing space for laser processing, a smoke exhaust channel of the at least one smoke exhaust assembly communicates with the processing space, the at least one smoke detection module is located in the processing space, the at least one smoke detection module is configured for detecting a smoke concentration value in the processing space, the at least one smoke detection module is electrically connected to the upper computer, and the upper computer is configured to adjust the target power of the laser light source module and/or a target processing speed based on the smoke concentration value detected by the at least one smoke detection module.

15. The laser processing equipment according to claim 5, wherein the laser processing equipment further comprises a housing, at least one smoke exhaust assembly and at least one smoke detection module; the housing encloses and forms a processing space for laser processing, a smoke exhaust channel of the at least one smoke exhaust assembly communicates with the processing space, the at least one smoke detection module is located in the processing space, the at least one smoke detection module is configured for detecting a smoke concentration value in the processing space, the at least one smoke detection module is electrically connected to the upper computer, and the upper computer is configured to adjust the target power of the laser light source module and/or a target processing speed based on the smoke concentration value detected by the at least one smoke detection module.

16. The laser processing equipment according to claim 12, wherein the at least one exhaust assembly comprises a first smoke exhaust module, the first smoke exhaust module and the laser module are located on a same side of the base material to be processed, the at least one smoke detection module comprises a first smoke detector, the first smoke detector is arranged between the laser module and the base material to be processed, and the upper computer is configured to adjust the target power and/or the target processing speed of the laser light source module based on a material of the base material to be processed and the smoke concentration value detected by the first smoke detector in an engraving mode; and/or the at least one smoke exhaust assembly comprises a second smoke exhaust module, the second smoke exhaust module is located on one side, away from the laser module, of the base material to be processed, the at least one smoke detection module comprises a second smoke detector, the second smoke detector is arranged on one side, away from the laser module, of the base material to be processed, and the upper computer is configured to adjust the target power and/or the target processing speed of the laser light source module based on the smoke concentration value detected by the second smoke detector being smaller than a preset smoke concentration range in a cutting mode.

17. The laser processing equipment according to claim 13, wherein the at least one exhaust assembly comprises a first smoke exhaust module, the first smoke exhaust module and the laser module are located on a same side of the base material to be processed, the at least one smoke detection module comprises a first smoke detector, the first smoke detector is arranged between the laser module and the base material to be processed, and the upper computer is configured to adjust the target power and/or the target processing speed of the laser light source module based on a material of the base material to be processed and the smoke concentration value detected by the first smoke detector in an engraving mode; and/or the at least one smoke exhaust assembly comprises a second smoke exhaust module, the second smoke exhaust module is located on one side, away from the laser module, of the base material to be processed, the at least one smoke detection module comprises a second smoke detector, the second smoke detector is arranged on one side, away from the laser module, of the base material to be processed, and the upper computer is configured to adjust the target power and/or the target processing speed of the laser light source module based on the smoke concentration value detected by the second smoke detector being smaller than a preset smoke concentration range in a cutting mode.

18. The laser processing equipment according to claim 14, wherein the at least one exhaust assembly comprises a first smoke exhaust module, the first smoke exhaust module and the laser module are located on a same side of the base material to be processed, the at least one smoke detection module comprises a first smoke detector, the first smoke detector is arranged between the laser module and the base material to be processed, and the upper computer is configured to adjust the target power and/or the target processing speed of the laser light source module based on a material of the base material to be processed and the smoke concentration value detected by the first smoke detector in the engraving mode; and/or the at least one smoke exhaust assembly comprises a second smoke exhaust module, the second smoke exhaust module is located on one side, away from the laser module, of the base material to be processed, the at least one smoke detection module comprises a second smoke detector, the second smoke detector is arranged on one side, away from the laser module, of the base material to be processed, and the upper computer is configured to adjust the target power and/or the target processing speed of the laser light source module based on the smoke concentration value detected by the second smoke detector being smaller than a preset smoke concentration range in a cutting mode.

\* \* \* \* \*